United States Patent
Suzuki

(10) Patent No.: US 11,124,174 B2
(45) Date of Patent: Sep. 21, 2021

(54) VEHICLE CONTROL SYSTEM

(71) Applicant: TOYOTA JIDOSHA KABUSHIKI KAISHA, Toyota (JP)

(72) Inventor: Yusuke Suzuki, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 16/583,752

(22) Filed: Sep. 26, 2019

(65) Prior Publication Data

US 2020/0130673 A1   Apr. 30, 2020

(30) Foreign Application Priority Data

Oct. 25, 2018   (JP) .............................. JP2018-200500

(51) Int. Cl.
| | |
|---|---|
| *B60W 20/19* | (2016.01) |
| *B60W 10/18* | (2012.01) |
| *B60W 50/10* | (2012.01) |
| *B60W 50/06* | (2006.01) |
| *B60W 30/18* | (2012.01) |

(52) U.S. Cl.
CPC ............ *B60W 20/19* (2016.01); *B60W 10/18* (2013.01); *B60W 30/18027* (2013.01); *B60W 50/06* (2013.01); *B60W 50/10* (2013.01); *B60W 2540/106* (2013.01); *B60W 2540/12* (2013.01)

(58) Field of Classification Search
CPC ...... B60W 20/19; B60W 10/18; B60W 50/10; B60W 50/06; B60W 30/18027; B60W 2540/12; B60W 2540/106; B60W 2540/10; B60W 30/188; B60W 30/00; B60K 26/02; B60K 28/00; B60T 7/06
See application file for complete search history.

(56) References Cited

U.S. PATENT DOCUMENTS

| | | | | |
|---|---|---|---|---|
| 4,507,986 | A | * | 4/1985 | Okamura .......... B60W 30/1882 477/43 |
| 4,899,857 | A | * | 2/1990 | Tateno ............ B60W 30/18027 477/73 |
| 5,024,305 | A | * | 6/1991 | Kurihara ............... B60W 10/02 477/175 |
| 2008/0047770 | A1 | * | 2/2008 | Breed ....................... B60T 7/06 180/273 |
| 2014/0243148 | A1 | | 8/2014 | Tojo et al. |
| 2018/0186352 | A1 | * | 7/2018 | Goto ........................ B60T 8/00 |
| 2020/0047761 | A1 | * | 2/2020 | Tsuda .................. B60W 30/182 |

FOREIGN PATENT DOCUMENTS

| | | |
|---|---|---|
| JP | 2006-138266 A | 6/2006 |
| JP | 2014-162452 A | 9/2014 |

\* cited by examiner

*Primary Examiner* — Richard M Camby
(74) *Attorney, Agent, or Firm* — Oliff PLC

(57) ABSTRACT

A vehicle control system to control acceleration in line with the driver's intention when depressing one of an accelerator pedal and a brake pedal after releasing the other one of the pedals in one-pedal mode. The vehicle control system is configured to obtain an operating speed of one of an accelerator pedal and a brake pedal returned to an initial position, set a target acceleration based on an operating amount of the other pedal depressed after releasing said one of the pedals, and increase a correction amount to correct the target acceleration if the operating speed of the returned pedal is fast.

12 Claims, 17 Drawing Sheets

VEHICLE CONTROL SYSTEM

CROSS REFERENCE TO RELATED APPLICATIONS

The present disclosure claims the benefit of Japanese Patent Application No. 2018-200500 filed on Oct. 25, 2018 with the Japanese Patent Office, the disclosure of which are incorporated herein by reference in its entirety.

BACKGROUND

Field of the Disclosure

Embodiments of the present disclosure relate to the art of a vehicle control system configured to control a driving force and a braking force in response to an operation of a pedal, and more particularly, to a vehicle control system configured to propel a vehicle in a one-pedal mode in which a driving force and a braking force are controlled by manipulating one pedal.

Discussion of the Related Art

JP-A-2006-138266 describes an acceleration and deceleration control device for a vehicle in which acceleration and deceleration can be controlled by an accelerator pedal in one-pedal mode. As indicated in FIG. 1, according to the teachings of JP-A-2006-138266, a target acceleration is set in accordance with a position of the accelerator pedal, and a stroke range of the accelerator pedal is divided into a decelerating range, a reference range, and an accelerating range. Specifically, when the accelerator pedal is positioned within the reference range, the acceleration and the deceleration are reduced to zero. The decelerating range is set within the narrower range than the reference range, and when the accelerator pedal is positioned within the decelerating range, the vehicle is decelerated. When a brake pedal is depressed, as shown in FIG. 2, the reference range is shifted toward decelerating range. Consequently, the vehicle is allowed to be accelerated easily by depressing the accelerator pedal after the braking operation. A shifting amount of the reference range is changeable depending on a magnitude of the braking force generated by depressing the brake pedal, or a pedal force applied to the brake pedal.

JP-A-2014-162452 describes a drive force control system for a hybrid vehicle in which a prime mover includes an engine and a motor. The drive force control system taught by JP-A-2014-162452 is configured to perform a torque assist by a drive motor at an initial stage when the vehicle starts moving from a stopped state on the basis of an amount of change of an operation state of an accelerator. According to the teachings of JP-A-2014-162452, therefore, the acceleration is increased sharply when launching the vehicle, and the driver can have the appropriate acceleration feeling.

According to the teachings of JP-A-2006-138266, when the brake pedal is depressed, the accelerating range of the accelerator pedal is increased so that the vehicle is accelerated by a less depression of the accelerator pedal. That is, in the one-pedal mode, the acceleration of the vehicle can be enhanced when accelerating the vehicle after decelerating the vehicle by depressing the brake pedal. However, according to the teachings of JP-A-2006-138266, the shifting amount of the reference range is changed on the basis of the magnitude of the braking force generated by depressing the brake pedal, or a depressing amount of the brake pedal. Therefore, the acceleration intended by the driver may not be generated when depressing the accelerator pedal after releasing the brake pedal.

In the case of depressing the accelerator pedal after releasing the brake pedal, the deceleration may not be established by operating the brake pedal arcuately in conformity with the driver's intention. For example, if the deceleration established by depressing the brake pedal is large, it is expected that a large acceleration is demanded after decelerating the vehicle so as to quickly accelerate the vehicle again. However, if the deceleration established by depressing the brake pedal is small, the acceleration demand after decelerating the vehicle may not always be small. Therefore, if the driver's intention is estimated based on the magnitude of the braking force generated by depressing the brake pedal or the depressing amount of the brake pedal, the vehicle may be decelerated continuously against the driver's intention or accelerated more than expected when depressing the accelerator pedal after releasing the brake pedal. For example, as indicated in FIG. 3, the vehicle would be decelerated continuously when depressing the accelerator pedal after releasing the brake pedal. In this case, the vehicle may be decelerated in spite of depressing the accelerator pedal, and the vehicle may not be accelerated satisfactory.

In addition, according to the teachings of JP-A-2006-138266, the acceleration characteristic for setting the target acceleration shown in FIG. 2 is shifted entirely within the stroke range of the accelerator pedal when the brake pedal is depressed. That is, if the reference range is sifted significantly, the acceleration characteristic is changed significantly within the entire stroke range when returning the reference range to the original range. For this reason, a shock may be generated when accelerating the vehicle by depressing the accelerator pedal after releasing the brake pedal.

Further, the teachings of JP-A-2006-138266 does not take account of disadvantages which may be caused when depressing the brake pedal after releasing the accelerator pedal. For example, as indicated in FIG. 4, the deceleration may be plateaued temporarily during a period from a point at which the accelerator pedal is fully released to establish a maximum deceleration in the one-pedal mode to a point at which the brake pedal is depressed. In this case, therefore, the deceleration may be changed significantly stepwise thereby providing the driver with uncomfortable feeling.

SUMMARY

Aspects of the present disclosure have been conceived noting the foregoing technical problems, and it is therefore an object of the present invention to provide a vehicle control system configured to control acceleration accurately in line with the driver's intention without generating a shock, when depressing one of an accelerator pedal and a brake pedal after releasing the other one of the pedals in one-pedal mode.

The vehicle control system according to the embodiment of the present disclosure is applied to a vehicle that can be propelled in one-pedal mode in which a braking force is applied to the vehicle by manipulating a brake pedal, and a driving force and the braking force are controlled by manipulating an accelerator pedal to accelerate and decelerate the vehicle. The vehicle control system comprises: a detector that collects data relating to operating conditions of the accelerator pedal and the brake pedal; and a controller that sets a target acceleration to control the driving force and the braking force based on the data collected by the detector. In order to achieve the above-explained objective, according to the embodiment of the present disclosure, the controller is configured to: obtain an operating speed of one of the accelerator pedal and the brake pedal returned to an initial position in a case of depressing the other one of the accelerator pedal and the brake pedal after releasing said one of the accelerator pedal and the brake pedal; set the target acceleration based on an operating amount of the pedal depressed after releasing said one of the accelerator pedal and the brake pedal; and increase a correction amount to correct the target acceleration if the operating speed of the pedal returned to an initial position is fast.

In a non-limiting embodiment, the controller may be further configured to: obtain an operating speed of the brake pedal returned to the initial position in a case of depressing the accelerator pedal after releasing the brake pedal; set the target acceleration based on an operating amount of the accelerator pedal depressed after releasing the brake pedal; and correct the target acceleration to reduce deceleration of the vehicle if the operating speed of the brake pedal is fast.

In a non-limiting embodiment, the controller may be further configured to: obtain an operating speed of the accelerator pedal returned to the initial position in a case of depressing the brake pedal after releasing the accelerator pedal; set the target acceleration based on an operating amount of the brake pedal depressed after releasing the accelerator pedal; and correct the target acceleration to increase deceleration of the vehicle if the operating speed of the accelerator pedal is fast.

In a non-limiting embodiment, the controller may be further configured to: correct the target acceleration only within a decelerating range where the target acceleration is a negative value; and control acceleration of the vehicle based on a normal target acceleration set in accordance with an operating amount of the accelerator pedal or the brake pedal instead of the corrected target acceleration during accelerating the vehicle, after correcting the target acceleration within the decelerating range.

In a non-limiting embodiment, the controller may be further configured to reduce the correction amount of the target acceleration gradually toward zero during a period from a point at which a correction of the target acceleration is completed after releasing the one of the accelerator pedal and the brake pedal to a point at which the other one of the accelerator pedal and the brake pedal is depressed.

Thus, the vehicle control system according to the embodiment of the present invention is applied to the vehicle that can be propelled in the one-pedal mode in which not only the driving force but also the braking force are controlled by manipulating the accelerator pedal. In the one-pedal mode the braking force may also be controlled by manipulating the brake pedal. For example, when decelerating the vehicle abruptly during propulsion in the one-pedal mode, the driver releases the accelerator pedal being depressed, and then depresses the brake pedal. After that, when accelerating the vehicle again, the driver releases the brake pedal and then depresses the accelerator pedal. In those situations, the vehicle control system corrects the target acceleration in accordance with an operating speed of the pedal returned to the initial position. To this end, the vehicle control system estimates that an intention of the driver to accelerate (or decelerate) the vehicle by depressing the accelerator pedal (or the brake pedal) is strong if the operating speed of the released pedal is fast. In this case, therefore, the vehicle control system increases the correction amount of the target acceleration so as to accelerate (or decelerate) the vehicle strongly by depressing the accelerator pedal (or the brake pedal). Therefore, in a case of depressing one of the accelerator pedal and the brake pedal after releasing the other one of the accelerator pedal and the brake pedal during propulsion in the one-pedal mode, acceleration and deceleration of the vehicle can be controlled properly in line with the driver's intention without providing uncomfortable feeling with the driver and without generating a shock.

Specifically, the vehicle control system estimates that an intention of the driver to accelerate the vehicle by depressing the accelerator pedal is strong if the speed to return the brake pedal is fast. In this case, the vehicle control system increases the correction amount of the target acceleration so as to reduce deceleration of the vehicle after depressing the accelerator pedal. That is, the target acceleration set to a negative value by manipulating the brake pedal is corrected in such a manner as to reduce deceleration of the vehicle (or to increase the target acceleration toward a positive value). Consequently, the vehicle can be accelerated sharply in response to a depression of the accelerator pedal. Therefore, in the case of depressing the accelerator pedal after releasing the brake pedal during propulsion in the one-pedal mode, the vehicle can be accelerated promptly in line with the driver's intention without providing uncomfortable feeling with the driver and without generating a shock.

Likewise, the vehicle control system estimates that an intention of the driver to decelerate the vehicle by depressing the brake pedal is strong if the speed to return the accelerator pedal is fast. In this case, the vehicle control system increases the correction amount of the target acceleration so as to increase deceleration of the vehicle after depressing the brake pedal. That is, the target acceleration set to a negative value by returning the accelerator pedal is corrected in such a manner as to increase deceleration of the vehicle (or to increase the target acceleration toward a negative value). Consequently, the vehicle can be decelerated smoothly in response to a depression of the brake pedal. Therefore, in the case of depressing the brake pedal after releasing the accelerator pedal during propulsion in the one-pedal mode, the vehicle can be decelerated promptly in line with the driver's intention without providing uncomfortable feeling with the driver and without generating a shock.

In addition, the vehicle control system according to the embodiment of the present disclosure corrects the target acceleration only within the decelerating range, and does not correct the target acceleration within an accelerating range. Therefore, after changing only the decelerating characteristic, the vehicle can be accelerated smoothly based on the normal target acceleration. For this reason, the correction of the target acceleration can be terminated without providing uncomfortable feeling with the driver, and without generating a shock.

Further, the controller reduces the correction amount of the target acceleration gradually toward zero during the period from the point at which the correction of the target acceleration is completed after releasing the one of the accelerator pedal and the brake pedal to the point at which the other one of the accelerator pedal and the brake pedal is depressed. That is, the corrected target acceleration is gradually changed to the normal target acceleration. After thus correcting the target acceleration, none of the pedals is operated in a predetermined period until any one of the accelerator pedal and the brake pedal is depressed. If such period in which none of the pedals is operated is long, the control system estimates that an intention of the driver to accelerate or decelerate the vehicle after depressing one of the pedals is weak. Therefore, the acceleration or deceleration may be controlled properly in line with the driver's intension to accelerate or decelerate the vehicle mildly if the intention of the driver to accelerate or decelerate the vehicle is weak.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Embodiments of the present invention will now be explained with reference to the accompanying drawings. Note that the embodiments shown below are merely examples of the present invention, and do not limit a scope of the present invention.

Figure 1:
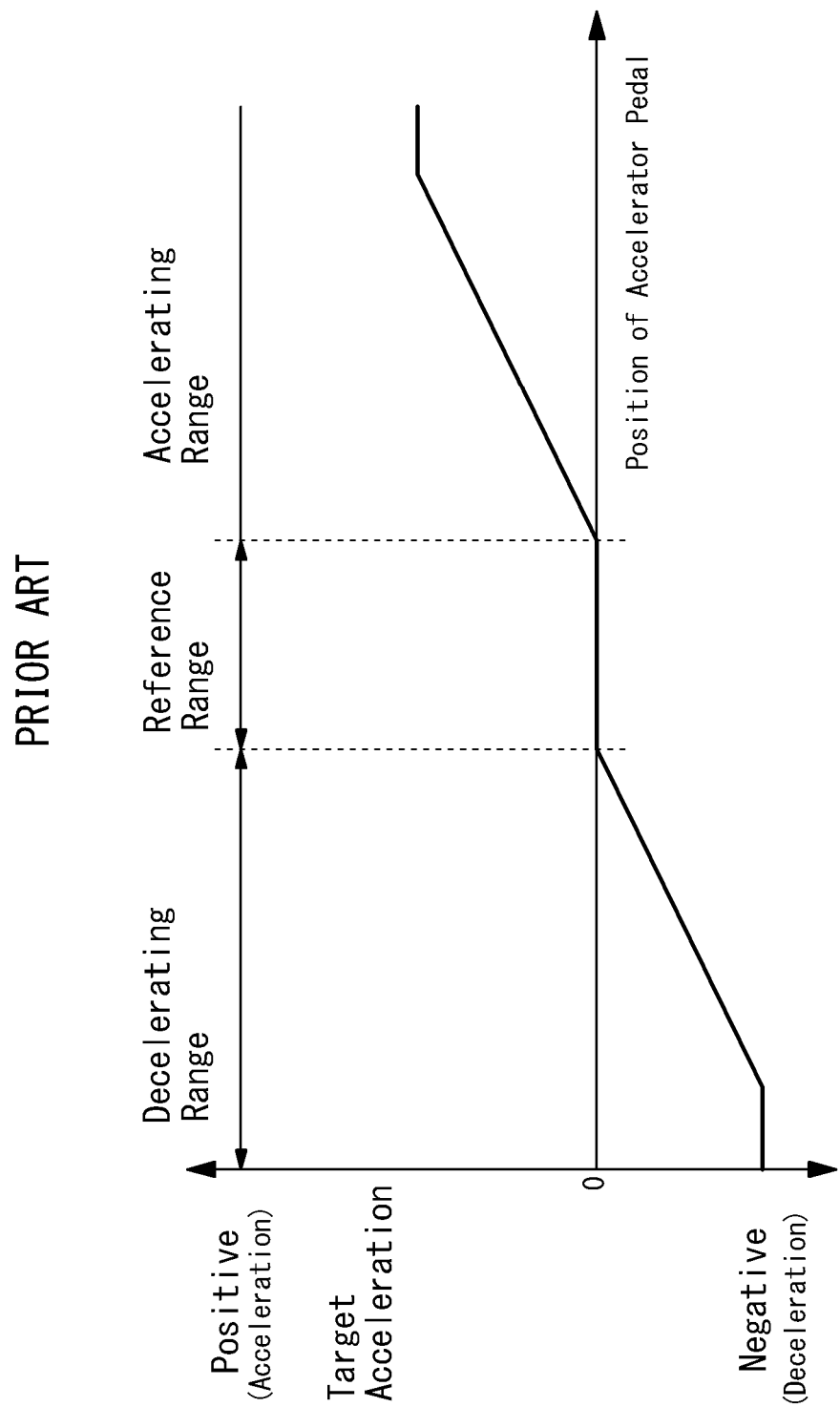
FIG. 1 is a map determining a target acceleration in each range of accelerator pedal with respect to a position of the accelerator pedal according to the conventional art.
Figure 2:
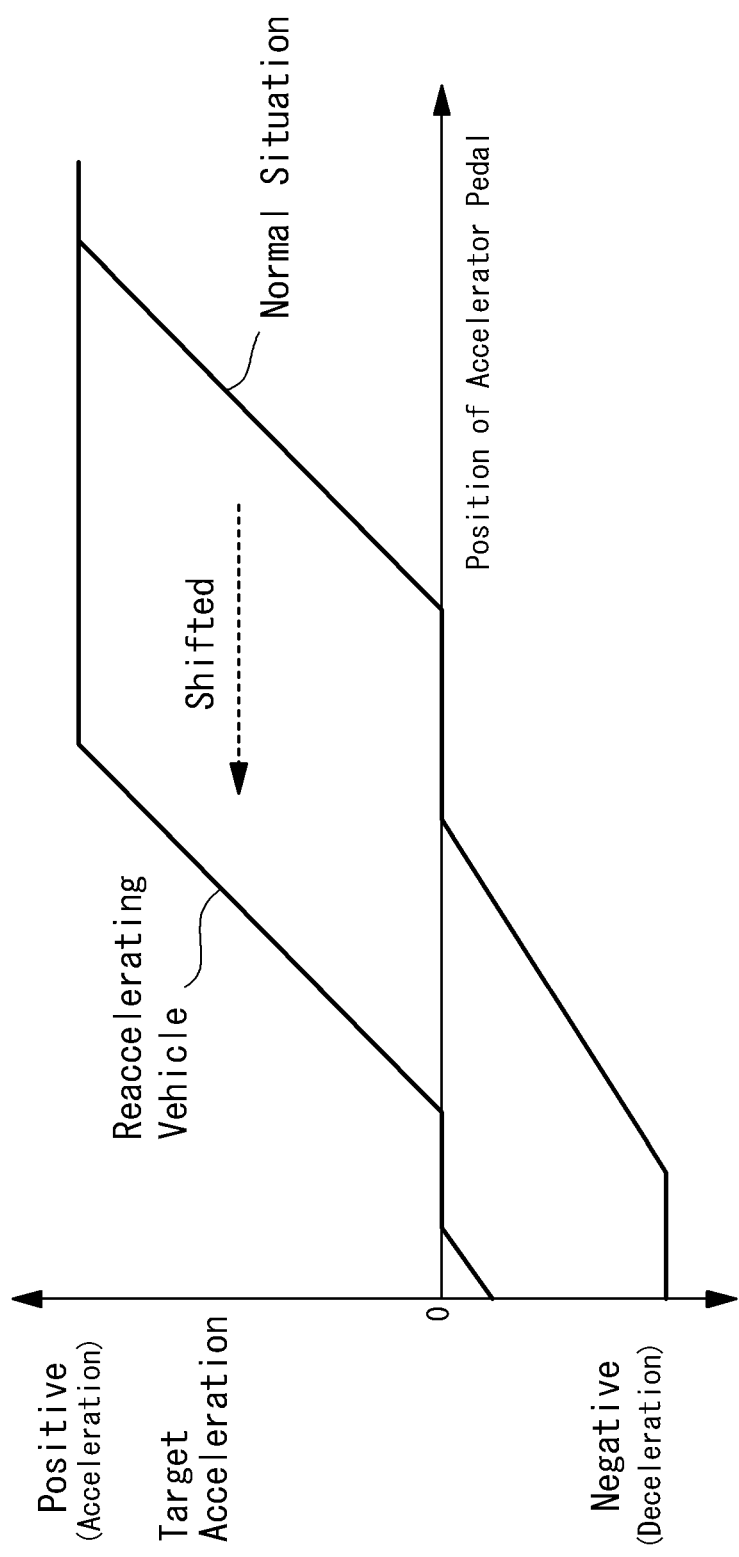
FIG. 2 is a map shifting a reference range in response to a depression of a brake pedal according to the conventional art.
Figure 3:
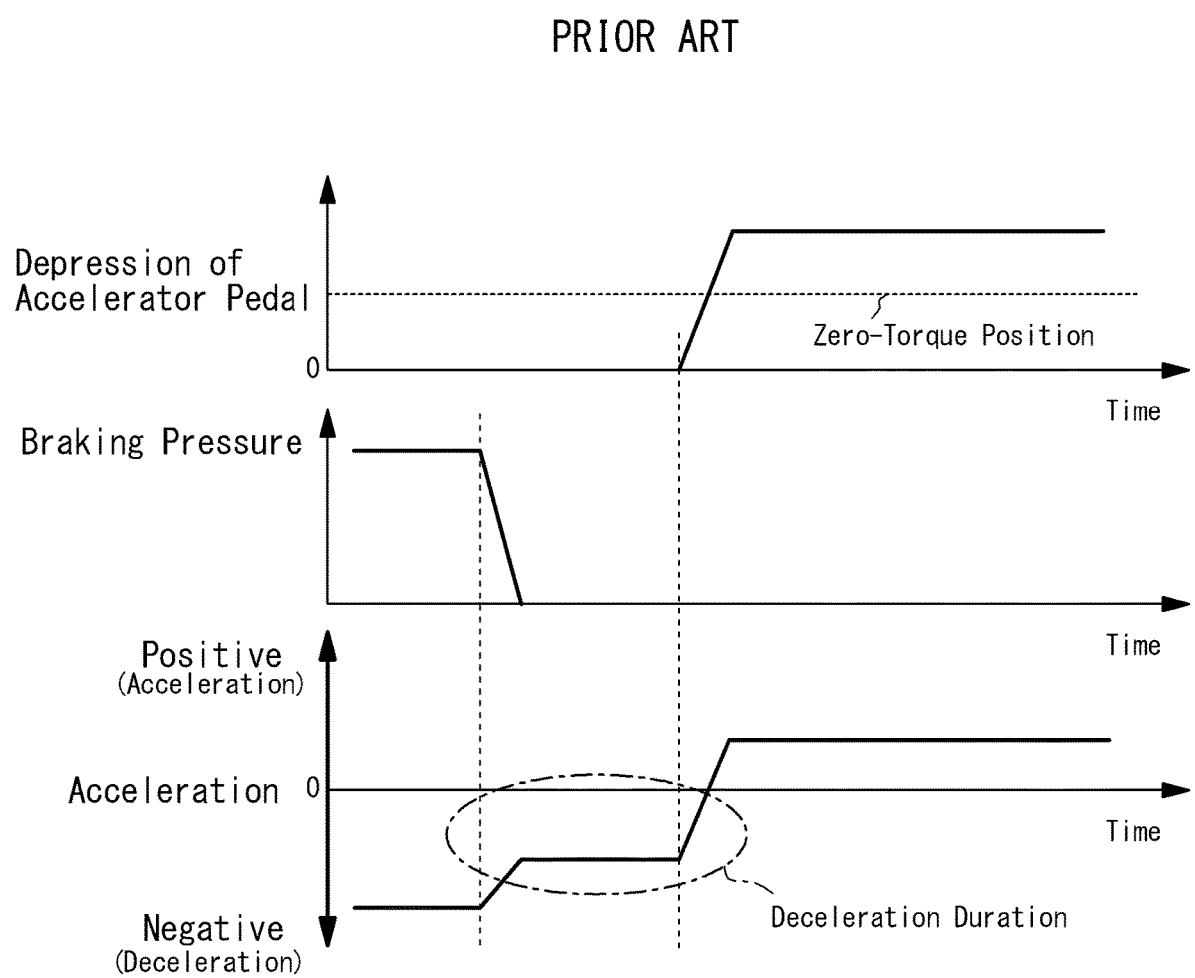
FIG. 3 is a time chart showing a temporal change in acceleration when depressing the accelerator pedal after releasing the brake pedal according to the conventional art.
Figure 4:
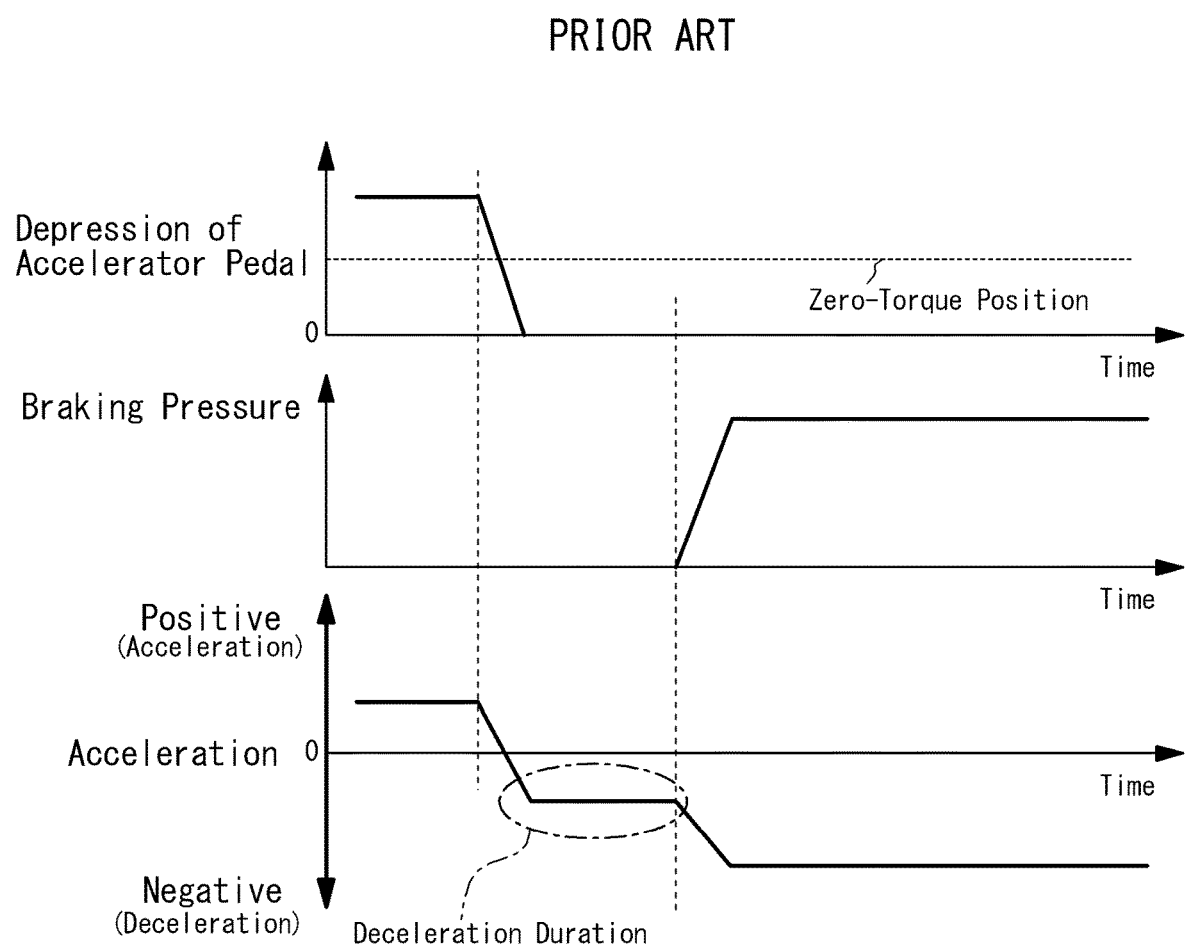
FIG. 4 is a time chart showing a temporal change in acceleration when depressing the brake pedal after releasing the accelerator pedal according to the conventional art.
Figure 5:
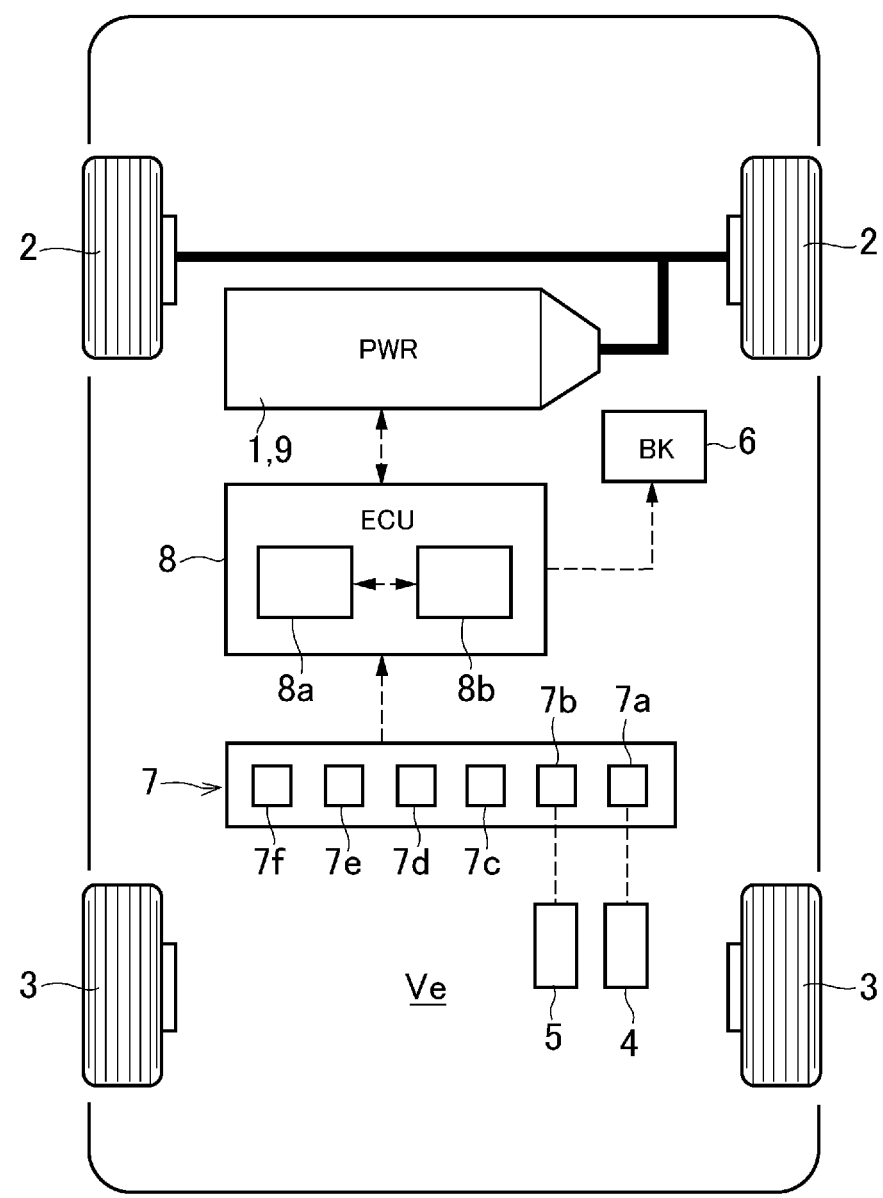
FIG. 5 is a schematic illustration showing one example of a structure of a vehicle to which the control system according to the embodiment of the present disclosure is applied.

Referring now to FIG. 5, there is shown an example of a drive system of a vehicle Ve to which the control system according to the embodiment of the present disclosure is applied. The vehicle Ve illustrated in FIG. 5 comprises a prime mover (referred to as "PWR" in FIG. 1) 1, a pair of front wheels 2, a pair of rear wheels 3, an accelerator pedal 4, a brake pedal 5, a brake device (referred to as "BK" in FIG. 1) 6, a detector 7, and a controller (referred to as "ECU" in FIG. 1) 8.

The prime mover 1 generates a drive torque to establish a driving force to propel the vehicle Ve. For example, an internal combustion engine such as a gasoline engine and a diesel engine may be adopted as the prime mover 1. An output power of the engine may be adjusted electrically, and the engine may be started and stopped electrically according to need. Given that the gasoline engine is used as the prime mover 1, an opening degree of a throttle valve, an amount of fuel supply or fuel injection, a commencement and a termination of ignition, an ignition timing etc. may be controlled electrically. Otherwise, given that the diesel engine is used as the prime mover 1, an amount of fuel injection, an injection timing, an opening degree of a throttle valve of an EGR (Exhaust Gas Recirculation) system etc. may be controlled electrically.

Further, a permanent magnet type synchronous motor, and an induction motor may be adopted as the prime mover 1. Those kinds of motors may serve not only as a motor to generate torque when driven by electricity suppled thereto, but also as a generator to generate electricity when rotated by a torque applied thereto. That is, a motor-generator may also be adopted as the prime mover 1. In this case, the prime mover 1 is switched between a motor and a generator by electrically controlling the prime mover 1, and an output speed and an output torque of the prime mover 1 may be controlled electrically.

In the example shown in FIG. 5, a motor-generator (as will be simply called the "motor" hereinafter) 9 is adopted as the prime mover 1. That is, the motor 9 serves not only as a motor to generate a drive torque propel the vehicle Ve, but also as a generator to generate a regenerate torque to decelerate the vehicle Ve.

In the vehicle Ve shown in FIG. 5, the front wheels 2 serve as drive wheels, and a drive torque generated by the prime mover 1 is delivered to the front wheels 2 to propel the vehicle Ve. However, the vehicle control system according to the embodiment of the present disclosure may also be applied to a rear-drive layout vehicle in which the rear wheels serve as drive wheels, and a four-wheel drive vehicle in which all of the wheels are driven by the torque of the prime mover 1. In a case of using the engine as the prime mover 1, a transmission (not shown) may be arranged downstream of the prime mover 1 to deliver the output torque of the prime mover 1 to the drive wheels via the transmission.

The prime mover 1 generates a torque by depressing the accelerator pedal 4 thereby establishing the driving force to propel the vehicle Ve. The torque of the prime mover 1 is increased in accordance with an increase in depression of the accelerator pedal 4. In other words, the torque of the prime mover 1 is adjusted in accordance with a position of the accelerator pedal 4. By contrast, the torque of the prime mover 1 is reduced by returning the accelerator pedal 4. In other words, the torque of the prime mover 1 is reduced in response to a reduction in depression of the accelerator pedal 4 thereby reducing the driving force to propel the vehicle Ve. Given that the motor 9 is adopted as the prime mover 1, a regenerative braking force derived from a regenerative torque of the motor 9 is applied to the vehicle Ve when the accelerator pedal 4 is returned. By contrast, given that the engine is adopted as the prime mover 1, an engine braking force derived from a friction torque and a pumping loss is applied to the vehicle Ve when the accelerator pedal 4 is returned.

Thus, the driving force and the braking force of the vehicle Ve is controlled by manipulating the accelerator pedal 4. For this purpose, the accelerator pedal 4 is provided with an accelerator position sensor 7a that detects a position (i.e., a depression) and an operating speed of the accelerator pedal 4. By detecting an operating speed of the accelerator pedal 4, for example, an operating direction of the accelerator pedal 4 can be estimated. That is, it is possible to determine whether the accelerator pedal 4 is depressed or returned by a driver.

The brake device 6 is actuated to establish a braking force applied to the vehicle Ve by depressing the brake pedal 5. The brake pedal 5 is provided with a brake stroke sensor 7b that detects a stroke of the brake pedal 5 depressed by the driver, and a hydraulic sensor 7c that detects a hydraulic pressure applied to the brake device 6 to estimate a pedal force applied to the brake pedal 5. Instead of the brake stroke sensor 7b, a brake switch (not shown) may also be used to detect an operating condition of the brake pedal 5 including an actuation of the brake device 6 and a depression of the brake pedal 5.

For example, a hydraulic disc brake and a drum brake may be adopted as the brake device 6. As described, the brake device 6 is actuated to generate a braking force by depressing the brake pedal 5. The brake device 6 may also be controlled by the controller 8 so that the brake device 6 generates a braking force in response to an operation of the accelerator pedal 4 in the one-pedal mode.

The detector 7 collects data about conditions of the vehicle Ve. Specifically, the detector 7 comprises: the above-mentioned accelerator position sensor 7a that detects e.g., a position of the accelerator pedal 4; the above-mentioned brake stroke sensor 7b that detects an operating amount (i.e., stroke) of the brake pedal 5; the above-mentioned hydraulic sensor 7c that detects a hydraulic pressure applied to the brake device 6 or a pedal force applied to the brake pedal 5; a wheel speed sensor 7d that detects a speed of the vehicle Ve; an acceleration sensor 7e that detects a longitudinal acceleration of the vehicle Ve; and a resolver (or a motor speed sensor) 7f that detects a rotational speed of an output shaft (not shown) of the motor 9, or a speed sensor (not shown) that detects a rotational speed of an output shaft (not shown) of the engine. The detector 7 is electrically connected to the controller 8 so that detection values obtained by those sensors are transmitted to the controller 8 in the form of an electric signal.

Specifically, the controller 8 is an electronic control unit including a microcomputer. In order to control the vehicle Ve, the data collected by the detector 7 is sent to the controller 8, and the controller 8 performs calculation using the incident data from the detector 7, and data and formulas stored in advance. Calculation results are transmitted from the controller 8 in the form of command signal.

The controller 8 comprises a calculator section 8a, and a controller section 8b. For example, the calculator section 8a receives data relating to an operating amount and an operating speed of the accelerator pedal 4 from the accelerator position sensor 7a, data relating to an operating amount and an operating speed of the brake pedal 5 as well as a change amount and a change rate of the hydraulic pressure applied to the brake device 6 from the brake stroke sensor 7b, and a speed of a predetermined wheel or the vehicle Ve from the wheel speed sensor 7d. The calculator section 8a is configured to calculate a target acceleration (or target deceleration) and a target drive torque of the vehicle Ve based on the data transmitted from those sensors. The calculator section 8a is further configured to correct the target acceleration (or target deceleration) based on the data transmitted from those sensors.

On the other hand, the controller section 8b is configured to control: an output power of the prime mover 1 based on the target drive torque calculated by the calculator section 8a; the driving force and the braking force generated in response to an operation the accelerator pedal 4 based on the target acceleration calculated by the calculator section 8a; the braking force generated in response to an operation the brake pedal 5 based on the target acceleration calculated by the calculator section 8a. For these purposes, the controller section 8b transmits control signals to the prime mover 1, the brake device 6, and so on.

Thus, the controller 8 sets a target acceleration based on the operating conditions of the accelerator pedal 4 and the brake pedal 5, and controls a driving force and a braking force in such a manner as to achieve the target acceleration. Although only one controller 8 is depicted in FIG. 5, a plurality of controllers may be arranged in the vehicle Ve to control the specific devices individually.

The vehicle Ve may be propelled in the one-pedal mode in which not only the driving force but also the braking force are changed in accordance with an operating amount of the accelerator pedal 4. Whereas, in a normal mode, the driving force is changed in accordance with an operating amount of the accelerator pedal 4, and the braking force is changed in accordance with an operating amount of the brake pedal 5. Thus, an operating mode of the vehicle Ve may be selected from the one-pedal mode and the normal mode.

The control system according to the embodiment of the present disclosure may also be applied to a vehicle that is operated only in the one-pedal mode.

In the one-pedal mode, specifically, a range of movement of the accelerator pedal 4 is divided into a decelerating range in which a depression (i.e, a stroke depth) of the accelerator pedal 4 is relatively small, and an accelerating range in which a depression of the accelerator pedal 4 is relatively large across a reference range (i.e., a zero-torque position) described e.g., in JP-A-2006-138266. Specifically, a rage from an initial position of the accelerator pedal 4 (i.e., a depression is 0%) to the reference range is the decelerating range, and a range from the reference range to a maximum position of the accelerator pedal 4 (i.e., a depression is 100%) is the accelerating range. Given that the accelerator pedal 4 is positioned within the decelerating range, a braking force to decelerate the vehicle Ve is increased with a reduction in depression of the accelerator pedal 4. By contrast, given that the accelerator pedal 4 is positioned within the accelerating range, a driving force to propel the vehicle Ve is increased with an increase in depression of the accelerator pedal 4.

Thus, in the accelerating range of the one-pedal mode, the accelerator pedal 4 serves as an accelerator pedal of the conventional art. That is, in the accelerating range, the driving force to propel the vehicle Ve is increased with an increase in an operating amount of the accelerator pedal 4.

Whereas, in the decelerating range of the one-pedal mode, the braking force to decelerate the vehicle Ve is increased with a reduction in an operating amount of the accelerator pedal 4. In the vehicle Ve, specifically, the braking force includes a braking force derived from a regenerative braking torque, and a braking force established by actuating the brake device 6. Given that an internal combustion engine is adopted as the prime mover 1, the braking force includes an engine braking force established by the engine. In the decelerating range, those braking forces are controlled cooperatively in such a manner as to achieve a required braking force. That is, in the one-pedal mode, the braking force greater than the engine braking force may be applied to the vehicle Ve so as to decelerate or stop the vehicle Ve.

According to the embodiment of the present disclosure, the controller 8 is configured to control the acceleration of the vehicle Ve in line with the driver's intention, in a case of depressing one of the accelerator pedal 4 and the brake pedal 5 after releasing the other one of the accelerator pedal 4 and the brake pedal 5 during propulsion in the one-pedal mode. To this end, for example, the controller 8 executes a routine shown in FIG. 6.

Figure 6:
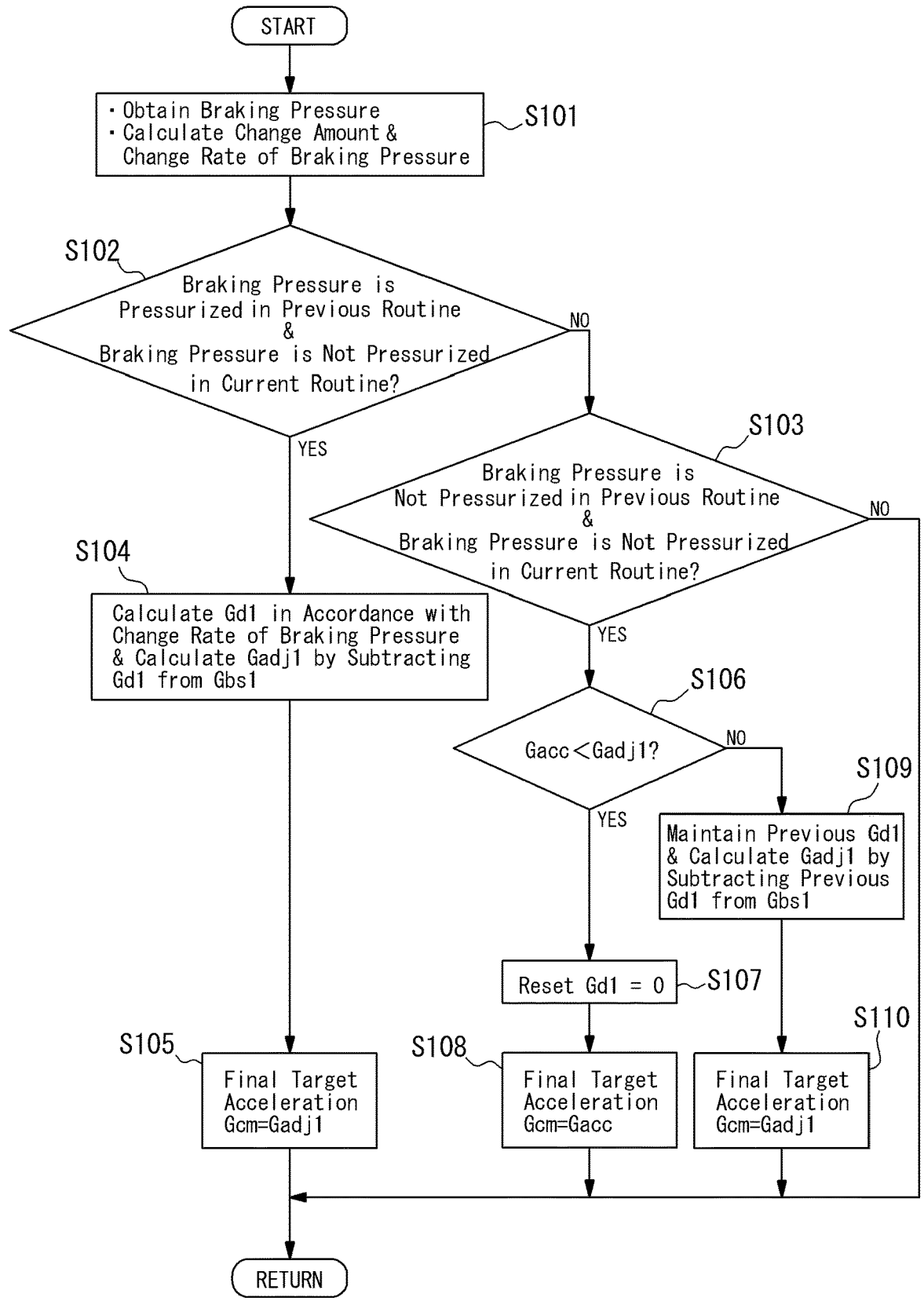
FIG. 6 is a flowchart showing one example of a routine executed by the vehicle control system according to the embodiment of the present disclosure in a case of depressing the accelerator pedal after releasing the brake pedal.

Specifically, the routine shown in FIG. 6 is executed in a case of depressing the accelerator pedal 4 after releasing the brake pedal 5 during propulsion in the one-pedal mode. In other words, the routine shown in FIG. 6 is executed in a case of releasing the brake pedal 5 and then depressing the accelerator pedal 4 during propulsion in the one-pedal mode.

At step S101, data relating to an operating state of the brake pedal 5 is detected, and an operating speed of the brake pedal 5 is calculated based on the detected operating state of the brake pedal 5. Specifically, a hydraulic pressure applied to the brake device 6 by depressing the brake pedal 5 (as will be simply called the "braking pressure" hereinafter) is detected, and a change amount in the braking pressure is calculated based on the detected braking pressure. Then, a change rate of the braking pressure corresponding to the operating speed of the brake pedal 5 is calculated based on the calculated change amount in the braking pressure.

Then, it is determined at step S102 to determine whether the brake pedal 5 being depressed is returned to the initial position in the current routine. That is, it is determined whether the braking pressure was pressurized in the previous routine but is not pressurized in the current routine. In other words, it is determined whether a predetermined pressure was added to a base pressure applied to the brake device 6 in the previous routine, and whether no pressure is added to the base pressure applied to the brake device 6 in the current routine. If the braking pressure was pressurized in the previous routine but is not pressurized in the current routine, the controller 8 determines that the brake pedal 5 is returned to the initial position. For example, the operating state such as the operating amount and the operating speed of the brake pedal 5 may be calculated based on the hydraulic pressure detected by the hydraulic sensor 7c. Instead, the operating amount and the operating speed of the brake pedal 5 may also be calculated based on a stroke of the brake pedal 5 detected by the brake stroke sensor 7b.

The answer of step S102 will be NO in a case that neither of the braking pressures detected in the previous and current routines are pressurized, that both of the braking pressures detected in the previous and current routines are pressurized, or that the braking pressure detected in the previous routine is not pressurized but the braking pressure detected in the current routine is pressurized. That is, if the brake pedal 5 is not returned to the initial position in the current routine, the answer of step S102 will be NO and the routine progresses to step S103.

At step S103, it is determined whether the brake pedal 5 is maintained to the initial position, in other words, it is determined whether the brake pedal 5 is not depressed. Specifically, at step S103, it is determined whether the braking pressure detected in the previous routine was not pressurized, and whether the braking pressure detected in the current routine is also not pressurized.

In a case that both of the braking pressures detected in the previous and current routines are pressurized, or that the braking pressure detected in the previous routine was not pressurized but the braking pressure detected in the current routine is pressurized, the answer of step S103 will be NO. That is, if the brake pedal 5 is currently being depressed, the answer of step S103 will be NO and the routine returns without executing any specific control. In this case, since the brake pedal 5 has not yet been returned, the controller 8 determines that the accelerator pedal 4 will not be depressed. Therefore, a correction of the target acceleration will not be executed, and the acceleration of the vehicle Ve is controlled based on a normal target acceleration that is not corrected.

By contrast, if the braking pressure detected in the previous routine was pressurized but the braking pressure detected in the current routine is not pressurized, that is, if the brake pedal 5 being depressed is returned to the initial position so that the answer of step S102 is YES, the routine progresses to step S104. In this case, since the brake pedal 5 is returned to the initial position, the controller 8 estimates that the accelerator pedal 4 will be depressed. Therefore, the routine progresses to step S104 to correct the target acceleration.

Specifically, the routine progresses to step S104 to calculate a correction amount Gd1 of the target acceleration to be set after releasing the brake pedal 5 and depressing the accelerator pedal 4, and to calculate a corrected target acceleration Gadj1 based on the correction amount Gd1. The correction amount Gd1 is used to correct the target acceleration to be set in accordance with an operating amount of the accelerator pedal 4 depressed after releasing the brake pedal 5. Specifically, the correction amount Gd1 is increased if the operating speed of the brake pedal 5 returned to the initial position before depressing the accelerator pedal 4 is high. That is, the correction amount Gd1 is set in accordance with the deceleration, and the corrected target acceleration Gadj1 is calculated by subtracting the correction amount Gd1 from a base deceleration (i.e., a target acceleration in the decelerating range) Gbs1. For example, the base deceleration Gbs1 may be set based on a result of a driving test or a simulation.

Figure 7:
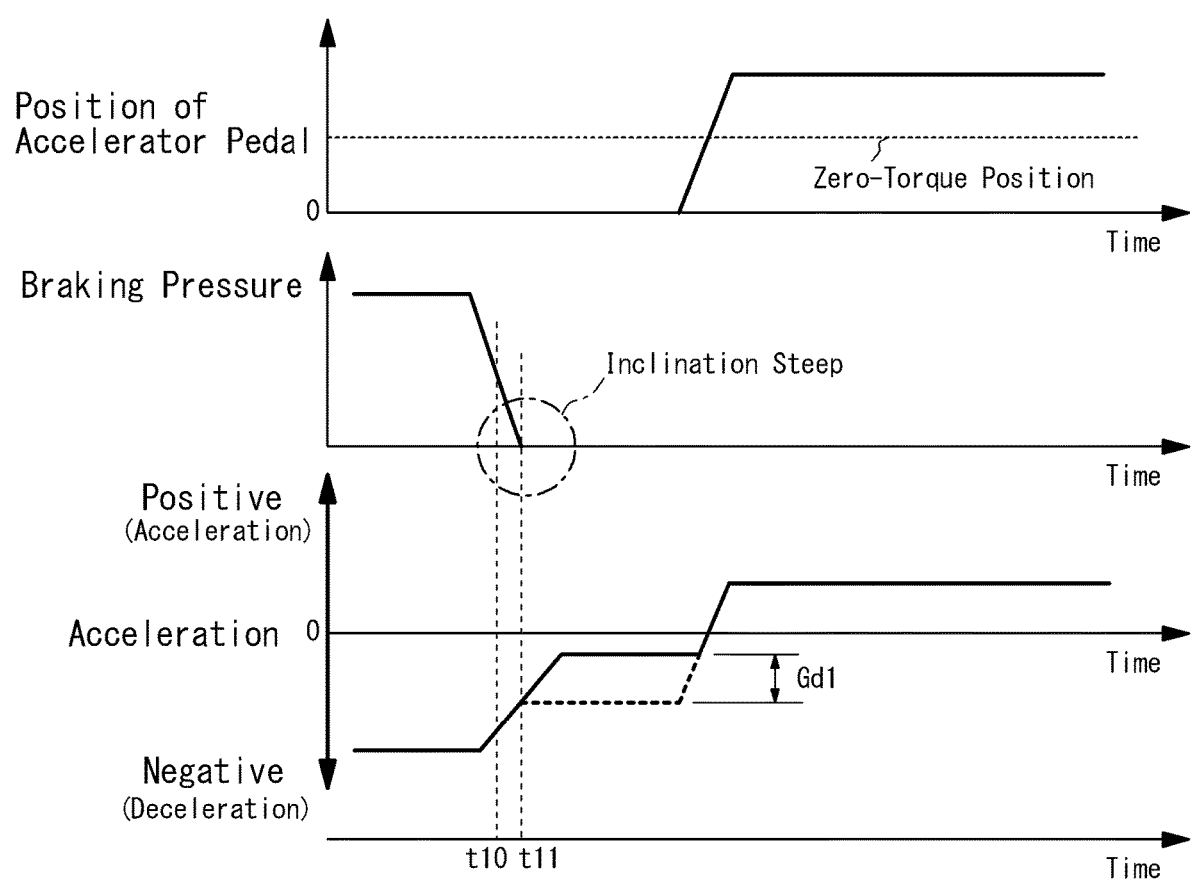
FIG. 7 is a time chart showing a temporal change in the acceleration of a case in which an operating amount of the brake pedal within a predetermined period of time before returned is large, during execution of the routine shown in FIG. 6.
Figure 8:
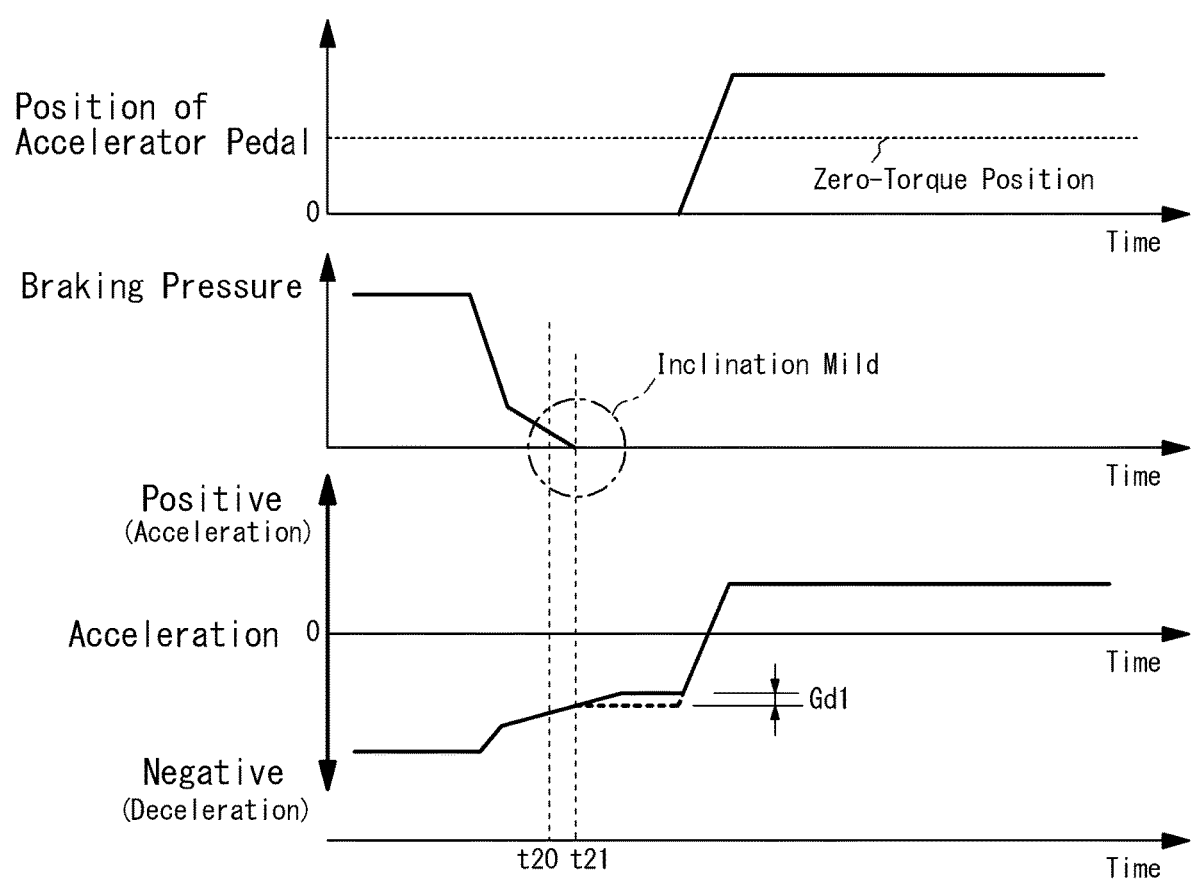
FIG. 8 is a time chart showing a temporal change in the acceleration of a case in which an operating amount of the brake pedal within the predetermined period of time before returned is small, during execution of the routine shown in FIG. 6.

Specifically, an operating speed of the brake pedal 5 when returning to the initial position is estimated based on the change rate of the braking pressure calculated at step S101. Alternatively, the change rate of the braking pressure may also be employed as the operating speed of the brake pedal 5. That is, the operating speed of the brake pedal 5 thus estimated is a change rate of an operating amount (i.e., an angle or a depression) of the brake pedal 5 immediately before returning the brake pedal 5 to the initial position. For example, the operating speed of the brake pedal 5 is calculated as an average value of the operating speed from a predetermined time point before an operating amount of the brake pedal 5 is reduced to zero to a point at which the operating amount of the brake pedal 5 is reduced to zero. A temporal change in the braking pressure during execution of the routine shown in FIG. 6 is shown in FIGS. 7 and 8. Specifically, the operating speed of the brake pedal 5 may be obtained based on an inclination of each line representing the change in the braking pressure from a predetermined point t10 or t20 before the braking pressure is reduced to zero to a point t11 or t21 at which the braking pressure is reduced to zero. For example, the predetermined point t10 or t20 may be set several tens milliseconds or several hundreds milliseconds before the braking pressure is reduced to zero, based on a result of a driving test or a simulation.

The correction amount Gd1 is calculated based on the operating speed of the brake pedal 5 (or the change rate in the braking pressure) thus calculated. As described, the correction amount Gd1 is increased if the operating speed of the brake pedal 5 is high. For example, the correction amount Gd1 is calculated in proportion to the inclination of each line in FIGS. 7 and 8 indicating the change in the braking pressure immediately before the braking pressure is reduced to zero. That is, the correction amount Gd1 is increased with an increase in inclination of the line indicating the change in the braking pressure. Specifically, FIG. 7 shows an example in which a change amount in the braking pressure (i.e., an operating amount of the brake pedal 5) within a predetermined period of time before the brake pedal 5 is returned to the initial position is large. On the other hand, FIG. 8 shows an example in which a change amount in the braking pressure (i.e., an operating amount of the brake pedal 5) within a predetermined period of time before the brake pedal 5 is returned to the initial position is small.

As shown in FIG. 7, in the case that the inclination of the line indicating the change in the braking pressure within the period from the point t10 to a point t11 is steep, the target acceleration is corrected based on the large correction amount Gd1. Specifically, the correction amount Gd1 is increased if the inclination of the line indicating the change in the braking pressure before the braking pressure is reduced to zero is steep, that is, the operating speed of the brake pedal 5 before the braking pressure is reduced to zero is high. In this case, therefore, the target acceleration is corrected based on the large correction amount Gd1 to reduce deceleration of the vehicle Ve. Consequently, as shown in FIG. 7, the target acceleration within the decelerating range is corrected significantly in the direction to reduce the deceleration.

By contrast, in the case that the inclination of the line indicating the change in the braking pressure within the period from the point t20 to a point t21 is mild, as shown in FIG. 8, the target acceleration is corrected based on the small correction amount Gd1. Specifically, the correction amount Gd1 is reduced if the inclination of the line indicating the change in the braking pressure before the braking pressure is reduced to zero is mild, that is, the operating speed of the brake pedal 5 before the braking pressure is reduced to zero is slow. In this case, therefore, the target acceleration is corrected based on the small correction amount Gd1 to reduce deceleration of the vehicle Ve. Consequently, as shown in FIG. 8, the target acceleration within the decelerating range is corrected slightly in the direction to reduce the deceleration.

Figure 9:
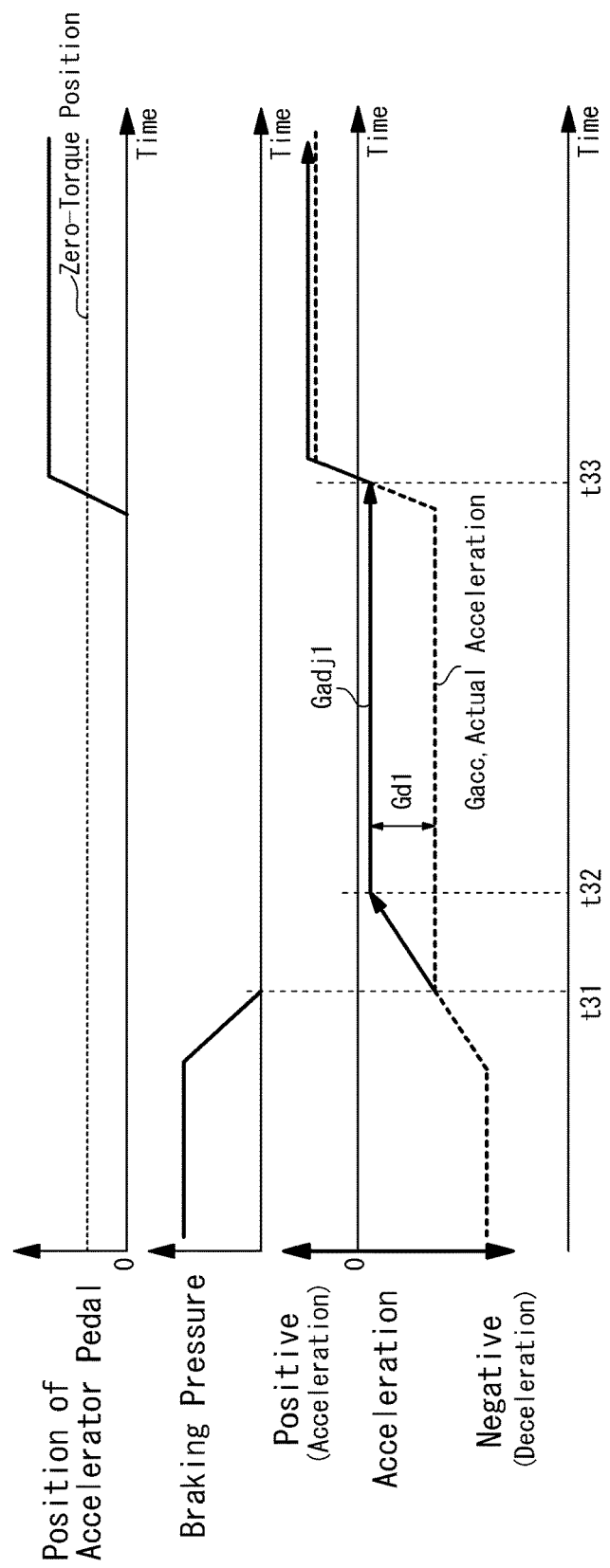
FIG. 9 is a time chart showing a correction of the target acceleration during execution of the routine shown in FIG. 6 in detail.

As shown in FIG. 9, the target acceleration is corrected based on the correction amount Gd1 during a period from a point t31 to a point t32 corresponding to a period required to depress the accelerator pedal 4 after releasing the brake pedal 5, at a change rate of the actual acceleration (or deceleration) before the point t31. In FIG. 9, specifically, the inclination of the dashed line indicating the acceleration before the point t31 is extended after the point t31 at the same inclination as indicated by the solid line. The corrected target acceleration Gadj1 based on the correction amount Gd1 is maintained to a steady level after the point t32. After the actual acceleration (or deceleration) of the vehicle Ve exceeds the corrected target acceleration Gadj1 at the point t33, the driving force and the braking force of the vehicle Ve are controlled based on the normal target acceleration set in accordance with an operating amount of the accelerator pedal 4. Specifically, the correction amount Gd1 is reset to zero when the normal target acceleration Gacc set in accordance with an operating amount of the accelerator pedal 4 is reduced smaller than the corrected target acceleration Gadj1 (that is, approximated to zero). Thereafter, the driving force and the braking force of the vehicle Ve are controlled based on the normal target acceleration Gacc.

Turning back to FIG. 6, after thus calculating the corrected target acceleration Gadj1 at step S104, the corrected target acceleration Gadj1 is set as a final target acceleration Gcm at step S105. Consequently, the driving force and the braking force of the vehicle Ve are controlled based on the final target acceleration Gcm, and thereafter the routine returns.

By contrast, in the case that neither of the braking pressures detected in the previous and current routines are pressurized, that is, the brake pedal 5 is maintained to the initial position so that the answer of step S103 is YES, the routine progresses to step S106.

At step S106, it is determined whether the target acceleration Gacc calculated based on an operating amount (i.e., a position or a depression) of the accelerator pedal 4 is smaller than the corrected target acceleration Gadj1 calculated at step S104. In this case, the target acceleration Gacc and the corrected target acceleration Gadj1 are set to negative values falling within the decelerating range respectively. At step S106, therefore, it is determined whether the target acceleration Gacc is closer to zero than the corrected target acceleration Gadj1. In other words, it is determined whether the deceleration is small.

If the target acceleration Gacc is smaller than the corrected target acceleration Gadj1, in other words, if the target acceleration Gacc is closer to zero than the corrected target acceleration Gadj1 so that the answer of step S106 is YES, the routine progresses to step S107.

At step S107, the correction amount Gd1 is reset to zero. In this case, as indicated in FIG. 9, the actual acceleration (i.e, deceleration) being controlled to achieve the target acceleration Gacc exceeds the corrected target acceleration Gadj1, and thereafter the vehicle Ve is to be controlled based on the normal target acceleration Gacc. To this end, the correction amount Gd1 is reset to zero, and the correction of the target acceleration based on the correction amount Gd1 is terminated. As described later, such reset of the correction amount Gd1 may be executed when the actual acceleration of the vehicle Ve exceeds zero. In other words, such reset of the correction amount Gd1 may be delayed until the vehicle Ve starts accelerating.

Thereafter, at step S108, the normal target acceleration Gacc is set as the final target acceleration Gcm. Consequently, the driving force and the braking force of the vehicle Ve are controlled based on the normal target acceleration Gacc set in accordance with an operating amount of the accelerator pedal 4 as the final target acceleration Gcm, and thereafter the routine returns.

By contrast, if the target acceleration Gacc is greater than the corrected target acceleration Gadj1 to the negative side, in other words, if the deceleration is large so that the answer of step S106 is NO, the routine progresses to step S109.

At step S109, the correction amount Gd1 calculated during the previous routine is maintained, and the corrected target acceleration Gadj1 is calculated by subtracting the correction amount Gd1 calculated during the previous routine from the base deceleration (i.e., the target acceleration in the decelerating range) Gbs1.

Thereafter, at step S110, the corrected target acceleration Gadj1 calculated at step S109 is set as the final target acceleration Gcm. Consequently, the driving force and the braking force of the vehicle Ve are controlled based on the corrected target acceleration Gadj1 as the final target acceleration Gcm, and thereafter the routine returns.

Figure 10:
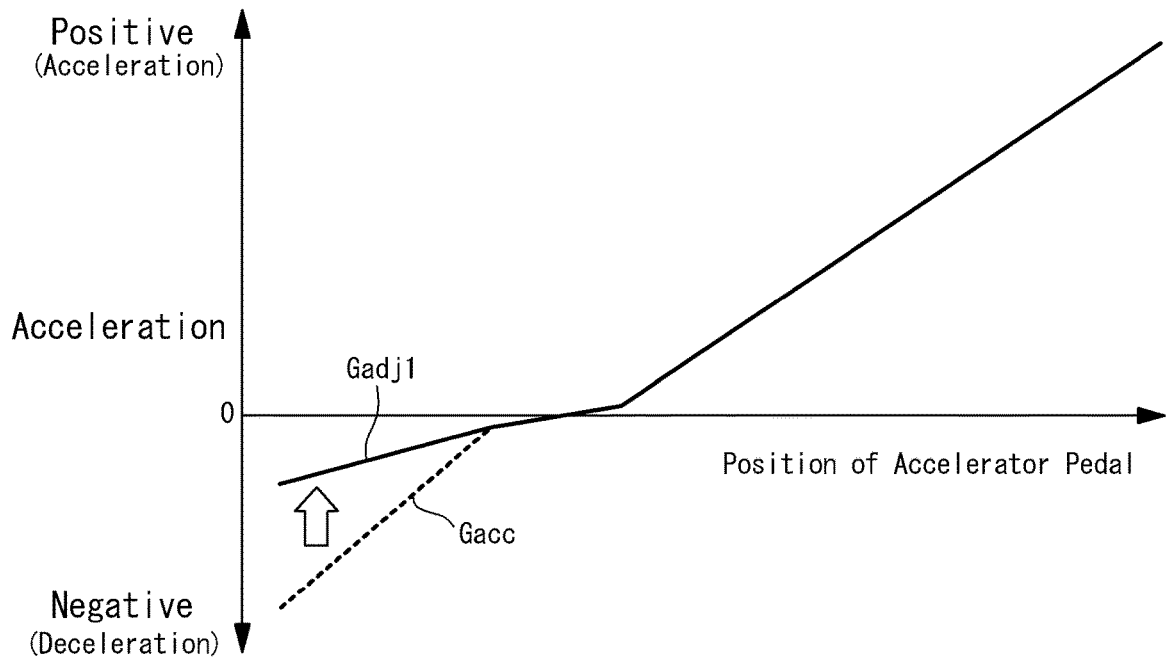
FIG. 10 is a map for correcting the target acceleration only within the decelerating range during execution of the routine shown in FIG. 6.
Figure 11:
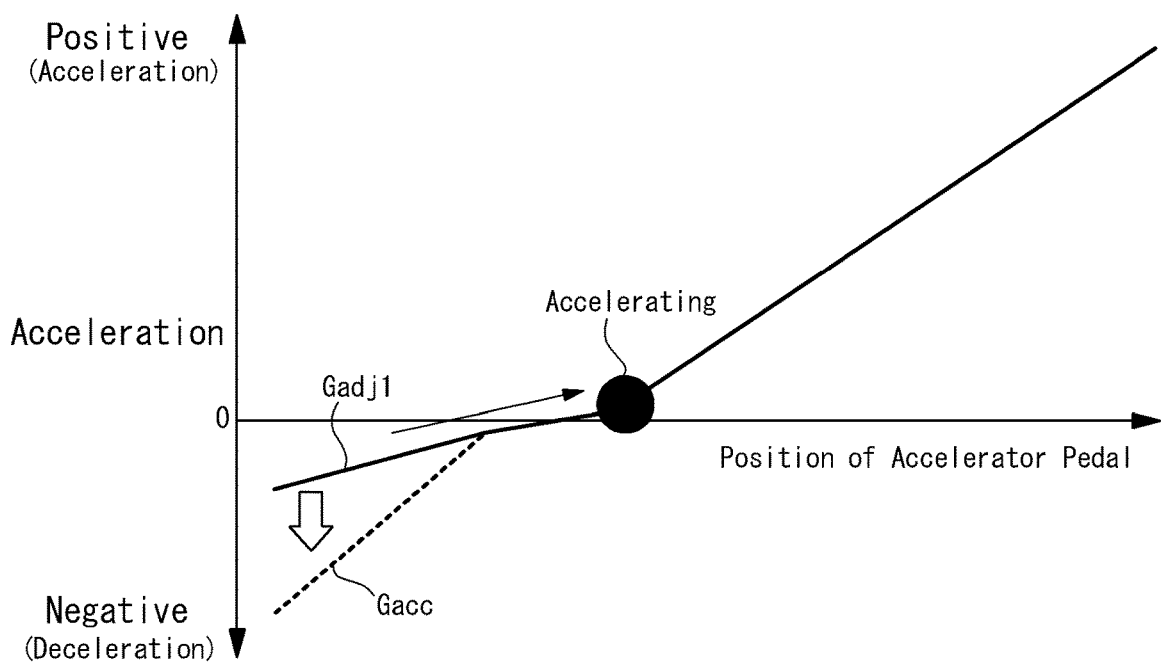
FIG. 11 is a map for controlling the acceleration based on the normal target acceleration after executing the routine shown in FIG. 6.

As indicated in the map determining the acceleration characteristic shown in FIG. 10, the target acceleration is corrected based on the correction amount Gd1 only within the decelerating range. That is, only the deceleration characteristic is corrected. After correcting the target acceleration within the decelerating range, as shown in FIG. 11, the normal target acceleration Gacc set in accordance with an operating amount of the accelerator pedal 4 is employed to control the acceleration of the vehicle Ve instead of the corrected target acceleration Gadj1 during accelerating the vehicle Ve. In other words, when the actual acceleration of the vehicle Ve being increased exceeds zero, the acceleration of the vehicle Ve is controlled based on the normal target acceleration Gacc instead of the corrected target acceleration Gadj1. As described, the acceleration of the vehicle Ve is controlled based on the normal target acceleration Gacc instead of the corrected target acceleration Gadj1 by resetting the correction amount Gd1 to zero. Therefore, the acceleration of the vehicle Ve can be controlled based on the normal target acceleration Gacc again after changing only the decelerating characteristic based on the correction amount Gd1 during accelerating the vehicle Ve. For this reason, the correction of the target acceleration based on the correction amount Gd1 can be terminated without providing uncomfortable feeling with the driver, and without generating a shock.

Figure 12:
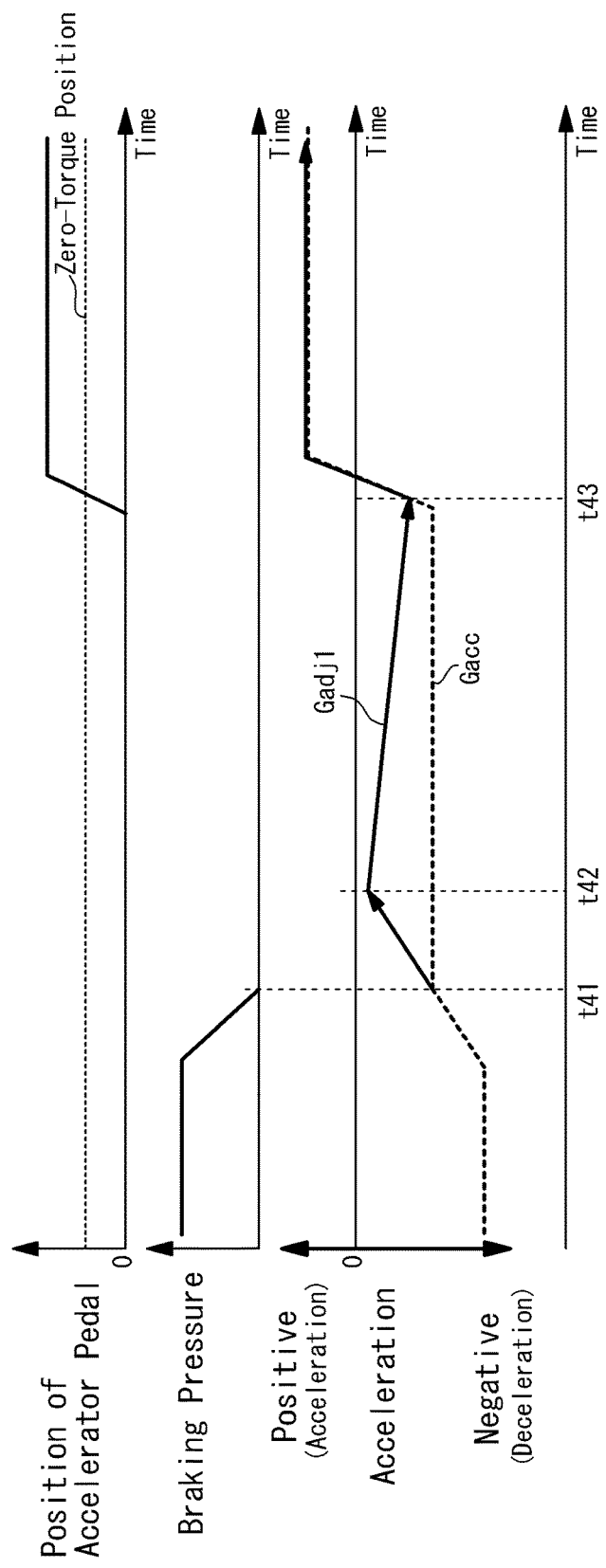
FIG. 12 is a time chart showing a temporal change in the correction amount of the target acceleration being reduced gradually during execution of the routine shown in FIG. 6.

After correcting the target acceleration based on the correction amount Gd1 in the situation where the brake pedal 5 being depressed is released and thereafter the accelerator pedal 4 is depressed, none of the pedals is operated in a predetermined period until the accelerator pedal 4 is depressed. As shown in FIG. 12, if such period in which none of the pedals is operated is long, the controller 8 estimates that an intention of the driver to accelerate the vehicle Ve after depressing the accelerator pedal 4 is weak. In this case, after correcting the target acceleration based on the correction amount Gd1 during a period from a point t41 at which the brake pedal 5 is returned to the initial position to a point t42, the correction amount Gd1 may be reduced gradually toward zero during a period from the point t42 to the point t43 at which the accelerator pedal 4 is depressed.

By thus changing the corrected target acceleration Gadj1 corrected based on the correction amount Gd1 gradually to the normal target acceleration Gacc, the acceleration may be controlled properly in line with the driver's intension to accelerate the vehicle Ve mildly.

For this purpose, a reference period or a threshold period to determine a fact that the intention of the driver to accelerate the vehicle Ve is weak may be set in advance. In this case, the correction amount Gd1 may be reduced gradually after the elapse of e.g., the reference period from the point at which the brake pedal 5 is returned to the initial position.

Figure 13:
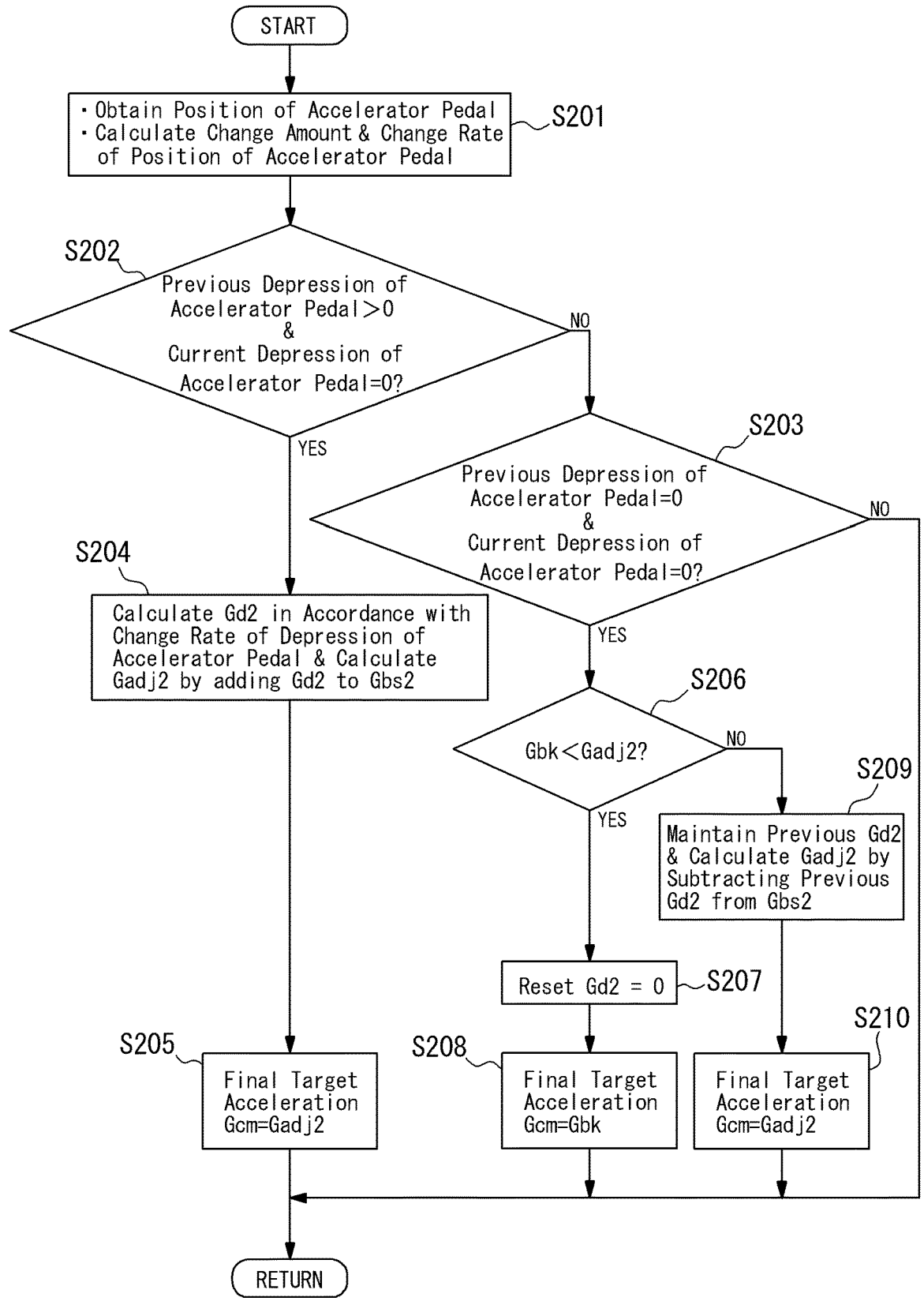
FIG. 13 is a flowchart showing another example of the routine executed by the vehicle control system according to the embodiment of the present disclosure in a case of depressing the brake pedal after releasing the accelerator pedal.

Turning to FIG. 13, there is shown another example of the routine executed by the controller 8 in a case of depressing the brake pedal 5 after releasing the accelerator pedal 4 during propulsion in the one-pedal mode. In other words, the routine shown in FIG. 13 is executed in a case of releasing the accelerator pedal 4 and then depressing the brake pedal 5 during propulsion in the one-pedal mode.

At step S201, data relating to an operating state of the accelerator pedal 4 is detected, and an operating speed of the accelerator pedal 4 is calculated based on the detected operating state of the accelerator pedal 4. Specifically, a position (or an angle) of the accelerator pedal 4 is detected, and a change amount in the position of the accelerator pedal 4 is calculated based on the detected position of the accelerator pedal 4. Then, a change rate of the position of the accelerator pedal 4 corresponding to an operating speed of the accelerator pedal 4 is calculated.

Then, it is determined at step S202 to determine whether the accelerator pedal 4 being depressed is returned to the initial position in the current routine. Specifically, it is determined whether the depression of the accelerator pedal 4 detected in the previous routine was greater than zero, and whether the depression of the accelerator pedal 4 detected in the current routine is zero. If the depression of the accelerator pedal 4 detected in the previous routine was greater than zero, and the depression of the accelerator pedal 4 detected in the current routine is zero, the controller 8 determines that the accelerator pedal 4 is returned to the initial position.

The answer of step S202 will be NO in a case that both of the depressions of the accelerator pedal 4 detected in the previous and current routines are greater than zero, that both of the depressions of the accelerator pedal 4 detected in the previous and current routines are zero, or that the depression of the accelerator pedal 4 detected in the previous routine was zero but the depression of the accelerator pedal 4 detected in the current routine is greater than zero. That is, if the accelerator pedal 4 is not returned to the initial position in the current routine, the answer of step S202 will be NO and the routine progresses to step S203.

At step S203, it is determined whether the accelerator pedal 4 is maintained to the initial position, in other words, it is determined whether the accelerator pedal 4 is not depressed. Specifically, at step S203, it is determined whether the depression of the accelerator pedal 4 detected in the previous routine was zero, and the depression of the accelerator pedal 4 detected in the current routine is also zero.

In a case that both of the depressions of the accelerator pedal 4 detected in the previous and current routines are greater than zero, or that the depression of the accelerator pedal 4 detected in the previous routine was zero but the depression of the accelerator pedal 4 detected in the current routine is greater than zero, the answer of step S203 will be NO. That is, if the accelerator pedal 4 is currently being depressed, the answer of step S203 will be NO and the routine returns without executing any specific control. In this case, since the accelerator pedal 4 has not yet been returned, the controller 8 determines that the brake pedal 5 will not be depressed. Therefore, the correction of the target acceleration will not be executed, and the acceleration of the vehicle Ve is controlled based on the normal target acceleration that is not corrected.

By contrast, if the depression of the accelerator pedal 4 detected in the previous routine was greater than zero but the depression of the accelerator pedal 4 detected in the current routine is zero, that is, if the accelerator pedal 4 being depressed is returned to the initial position so that the answer of step S202 is YES, the routine progresses to step S204. In this case, since the accelerator pedal 4 is returned to the initial position, the controller 8 determines that the brake pedal 5 will be depressed. Therefore, the routine progresses to step S204 to correct the target acceleration.

Specifically, the routine progresses to step S204 to calculate a correction amount Gd2 of the target acceleration to be set after releasing the accelerator pedal 4 and depressing the brake pedal 5, and to calculate a corrected target acceleration Gadj2 based on the correction amount Gd2. The correction amount Gd2 is used to correct the target acceleration to be set in accordance with an operating amount of the brake pedal 5 depressed after releasing the accelerator pedal 4. Specifically, the correction amount Gd2 is increased if the operating speed of the accelerator pedal 4 before depressing the brake pedal 5 is high. That is, the correction amount Gd2 is set in accordance with the deceleration, and the corrected target acceleration Gadj2 is calculated by adding the correction amount Gd2 from a base deceleration (i.e., a target acceleration in the decelerating range) Gbs2. For example, the base deceleration Gbs2 may be set based on a result of a driving test or a simulation.

Figure 14:
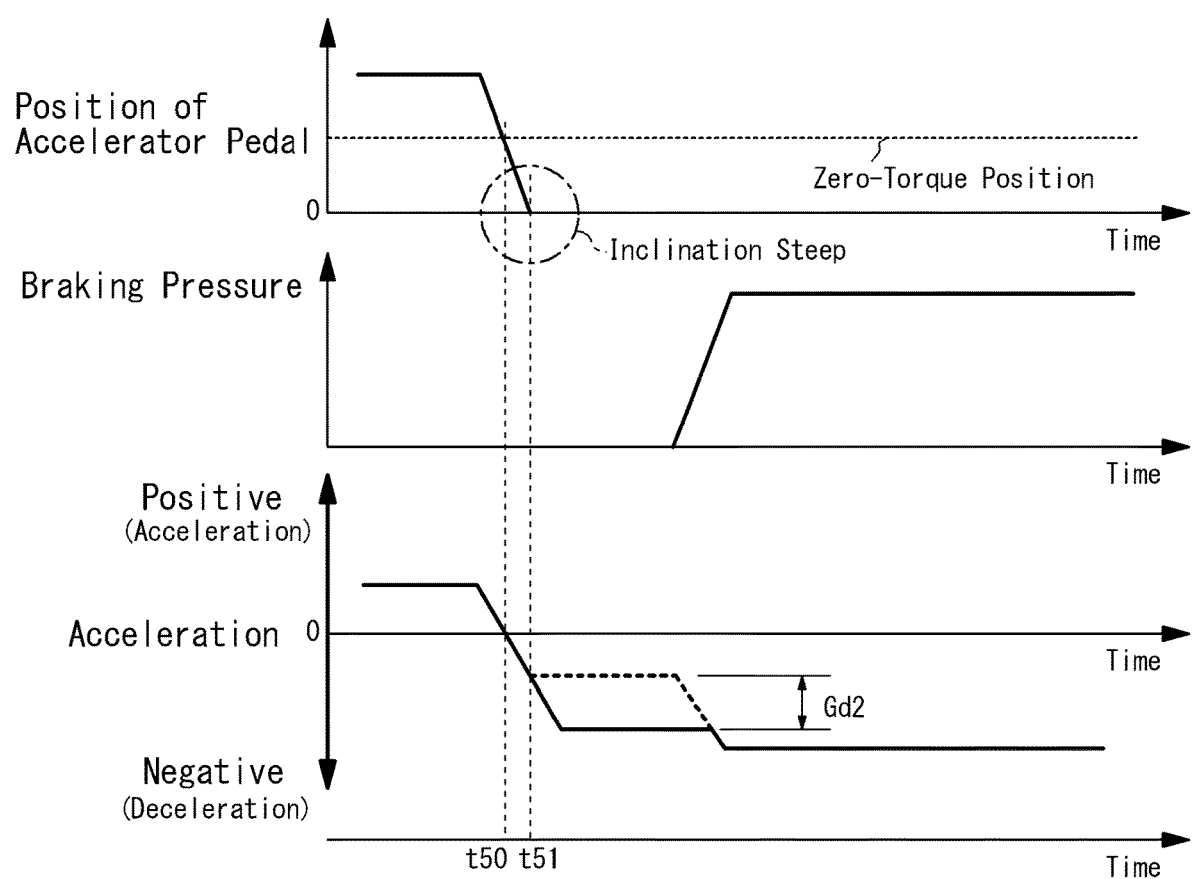
FIG. 14 is a time chart showing a temporal change in the acceleration (i.e., deceleration) of a case in which an operating amount of the accelerator pedal before returned is large, during execution of the routine shown in FIG. 13.
Figure 15:
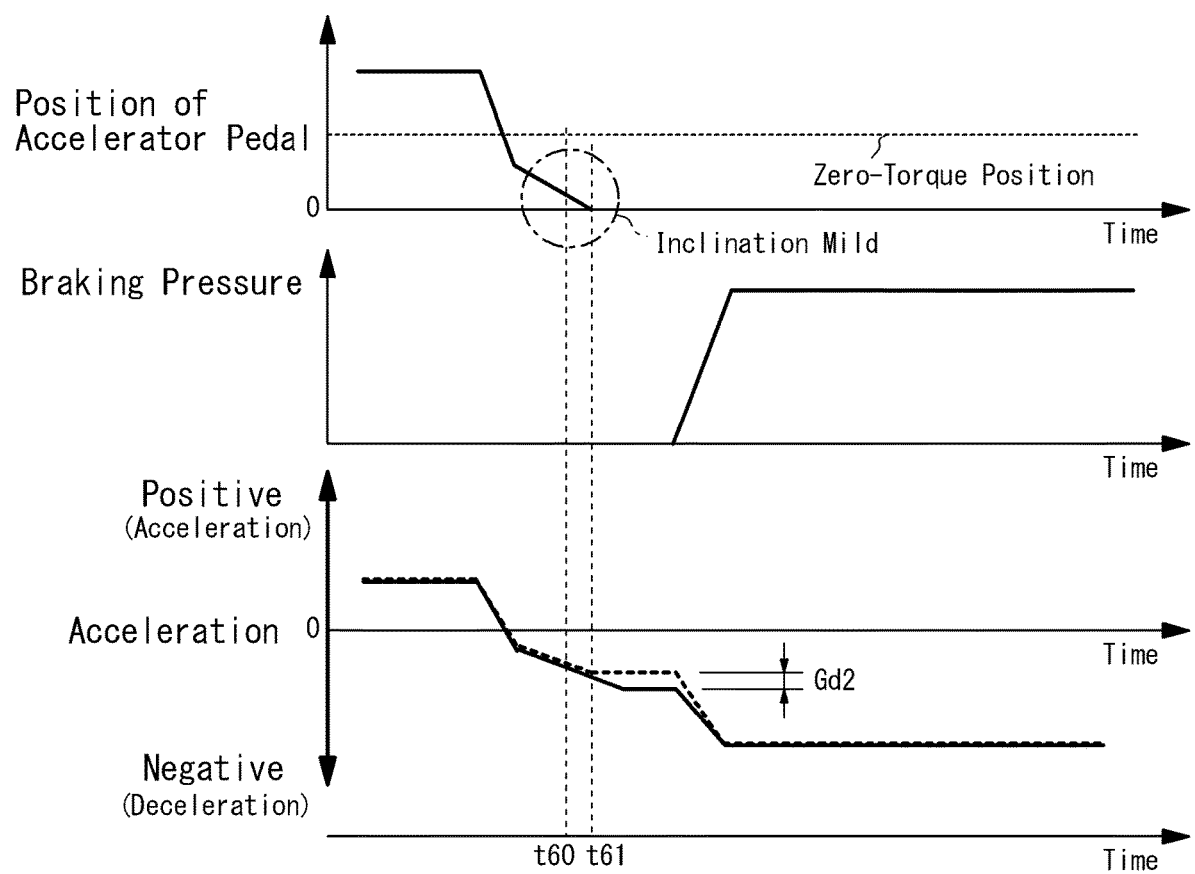
FIG. 15 is a time chart showing a temporal change in the acceleration (i.e., deceleration) of a case in which an operating amount of the accelerator pedal before returned is small, during execution of the routine shown in FIG. 13.

Specifically, an operating speed of the accelerator pedal 4 when returning to the initial position is estimated based on the change rate of the position of the accelerator pedal 4 calculated at step S201. That is, the operating speed of the accelerator pedal 4 thus estimated is a change rate of an operating amount (i.e., an angle or a depression) of the accelerator pedal 4 immediately before returning the accelerator pedal 4 to the initial position. For example, the operating speed of the accelerator pedal 4 is calculated as an average value of the operating speed from a predetermined time point before an operating amount of the accelerator pedal 4 is reduced to zero to a point at which the operating amount of the accelerator pedal 4 is reduced to zero. A temporal change in the position of accelerator pedal 4 during execution of the routine shown in FIG. 13 is shown in FIGS. 14 and 15. Specifically, the operating speed of the accelerator pedal 4 may be obtained based on an inclination of each line representing the change in the position of accelerator pedal 4 from a predetermined point t50 or t60 before the depression of accelerator pedal 4 is reduced to zero to a point t51 or t61 at which the depression of accelerator pedal 4 is reduced to zero. For example, the predetermined point t50 or t60 may be set several tens milliseconds or several hundreds milliseconds before the depression of accelerator pedal 4 is reduced to zero, based on a result of a driving test or a simulation.

The correction amount Gd2 is calculated based on the operating speed of the accelerator pedal 4 (or the change rate in the position of the accelerator pedal 4) thus calculated. As described, the correction amount Gd2 is increased if the operating speed of the accelerator pedal 4 is high. For example, the correction amount Gd2 is calculated in proportion to the inclination of each line in FIGS. 14 and 15 indicating the change in the position of the accelerator pedal 4 immediately before the depression of the accelerator pedal 4 is reduced to zero. That is, the correction amount Gd2 is increased with an increase in inclination of the line indicating the change in the position of the accelerator pedal 4. Specifically, FIG. 14 shows an example in which a change in the position of the accelerator pedal 4 (i.e., an operating amount of the accelerator pedal 4) within a predetermined period of time before the accelerator pedal 4 is returned to the initial position is large. On the other hand, FIG. 15 shows an example in which a change in the position of the accelerator pedal 4 (i.e., an operating amount of the accelerator pedal 4) within a predetermined period of time before the accelerator pedal 4 is returned to the initial position is small.

As shown in FIG. 14, in the case that the inclination of the line indicating the position of the accelerator pedal 4 within the period from the point t50 to the point t51 is steep, the target acceleration is corrected based on the large correction amount Gd2. Specifically, the correction amount Gd2 is increased if the inclination of the line indicating the position of the accelerator pedal 4 before the depression of the accelerator pedal 4 is reduced to zero is steep, that is, the operating speed of the accelerator pedal 4 before the depression of the accelerator pedal 4 is reduced to zero is high. In this case, therefore, the target acceleration is corrected based on the large correction amount Gd2 to increase deceleration of the vehicle Ve. Consequently, as shown in FIG. 14, the target acceleration within the decelerating range is corrected significantly in the direction to increase the deceleration.

By contrast, in the case that the inclination of the line indicating the position of the accelerator pedal 4 within the period from a point t60 to a point t61 is mild, as shown in FIG. 15, the target acceleration is corrected based on the small correction amount Gd2. Specifically, the correction amount Gd2 is reduced if the inclination of the line indicating the position of the accelerator pedal 4 before the depression of the accelerator pedal 4 is reduced to zero is mild, that is, the operating speed of the accelerator pedal 4 before the depression of the accelerator pedal 4 is reduced to zero is slow. In this case, therefore, the target acceleration is corrected based on the small correction amount Gd2 to increase deceleration of the vehicle Ve. Consequently, as shown in FIG. 15, the target acceleration within the decelerating range is corrected slightly in the direction to increase the deceleration.

Figure 16:
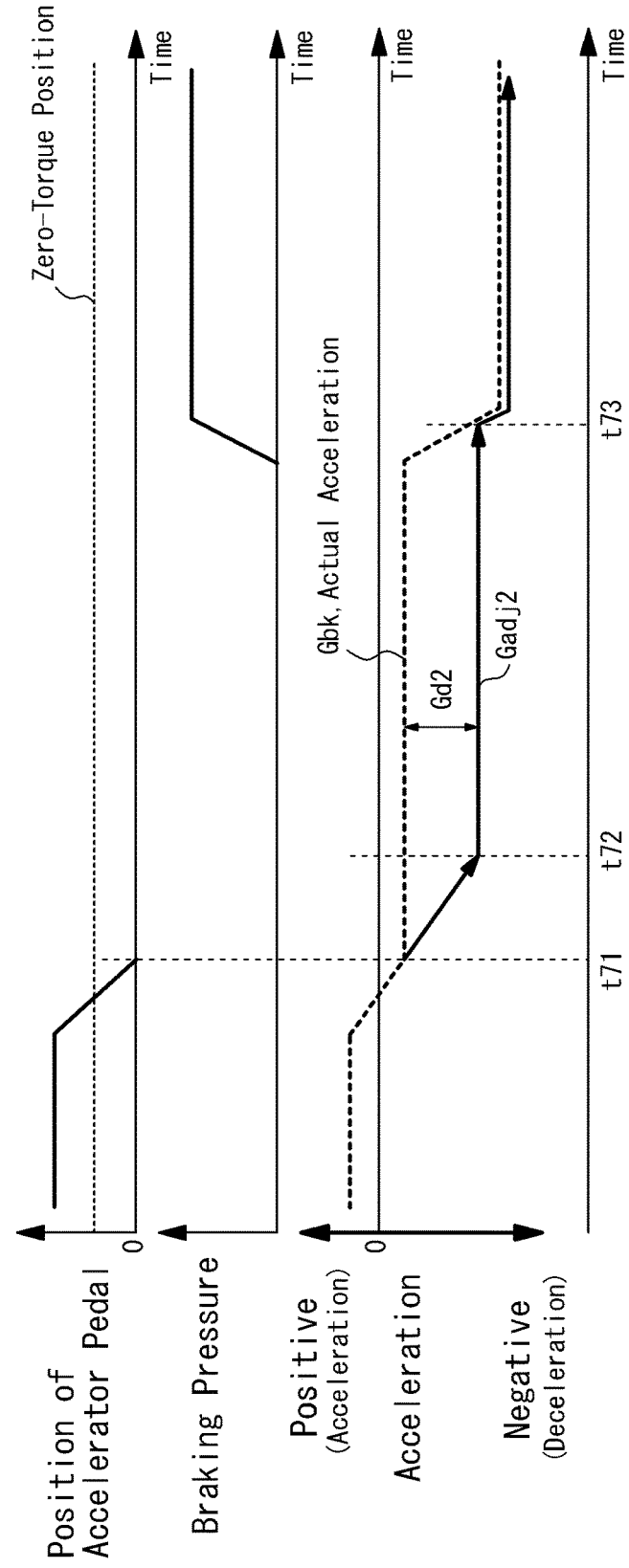
FIG. 16 is a time chart showing a correction of the target acceleration during execution of the routine shown in FIG. 13 in detail.

As shown in FIG. 16, the target acceleration is corrected based on the correction amount Gd2 during a period from a point t71 to a point t72 corresponding to a period required to depress the brake pedal 5 after releasing the accelerator pedal 4, at a change rate of the actual acceleration (or deceleration) before the point t71. In FIG. 16, specifically, the inclination of the dashed line indicating the acceleration before the point t71 is extended after the point t71 at the same inclination as indicated by the solid line. The corrected target acceleration Gadj2 based on the correction amount Gd2 is maintained to a steady level after the point t72. After the actual acceleration (or deceleration) of the vehicle Ve reaches the corrected target acceleration Gadj2 at the point t73, the driving force and the braking force of the vehicle Ve are controlled based on the normal target acceleration set in accordance with an operating amount of the brake pedal 5. Specifically, the correction amount Gd2 is reset to zero when the normal target acceleration Gbk set in accordance with an operating amount of the brake pedal 5 is increased greater than the corrected target acceleration Gadj2. Thereafter, the driving force and the braking force of the vehicle Ve are controlled based on the normal target acceleration Gbk.

Turning back to FIG. 13, after thus calculating the corrected target acceleration Gadj2 at step S204, the corrected target acceleration Gadj2 is set as a final target acceleration Gcm at step S205. Consequently, the driving force and the braking force of the vehicle Ve are controlled based on the final target acceleration Gcm, and thereafter the routine returns.

By contrast, in the case that both of the depressions of the accelerator pedal 4 detected in the previous and current routines are zero, that is, the accelerator pedal 4 is maintained to the initial position so that the answer of step S203 is YES, the routine returns to step S206.

At step S206, it is determined whether the target acceleration Gbk calculated based e.g., on the braking pressure is greater than the corrected target acceleration Gadj2 calculated at step S204. In this case, the target acceleration Gbk and the corrected target acceleration Gadj2 are set to negative values respectively falling within the decelerating range. At step S206, therefore, it is determined whether the target acceleration Gbk is greater than the corrected target acceleration Gadj2 to the negative side. In other words, it is determined whether the deceleration is large.

If the target acceleration Gbk is greater than the corrected target acceleration Gadj2 to the decelerating side so that the answer of step S206 is YES, the routine progresses to step S207.

At step S207, the correction amount Gd2 is reset to zero. In this case, as indicated in FIG. 16, the actual acceleration (i.e, deceleration) being controlled to achieve the target acceleration Gbk exceeds the corrected target acceleration Gadj2, and thereafter the vehicle Ve is to be controlled based on the normal target acceleration Gbk. To this end, the correction amount Gd2 is reset to zero, and the correction of the target acceleration based on the correction amount Gd2 is terminated. As described later, such reset of the correction amount Gd2 may be executed when the actual acceleration of the vehicle Ve exceeds zero. In other words, such reset of the correction amount Gd1 may be delayed until the vehicle Ve starts accelerating.

Thereafter, at step S208, the normal target acceleration Gbk is set as the final target acceleration Gcm. Consequently, the driving force and the braking force of the vehicle Ve are controlled based on the normal target acceleration Gbk set in accordance with an operating amount of the brake pedal 5 as the final target acceleration Gcm, and thereafter the routine returns.

By contrast, if the target acceleration Gbk is smaller than the corrected target acceleration Gadj2 to the negative side, in other words, if the deceleration is small so that the answer of step S206 is NO, the routine progresses to step S209.

At step S209, the correction amount Gd2 calculated during the previous routine is maintained, and the corrected target acceleration Gadj2 is calculated by subtracting the correction amount Gd2 calculated during the previous routine from the base deceleration (i.e., the target acceleration in the decelerating range) Gbs2.

Thereafter, at step S210, the corrected target acceleration Gadj2 calculated at step S209 is set as the final target acceleration Gcm. Consequently, the driving force and the braking force of the vehicle Ve are controlled based on the corrected target acceleration Gadj2 as the final target acceleration Gcm, and thereafter the routine returns.

Figure 17:
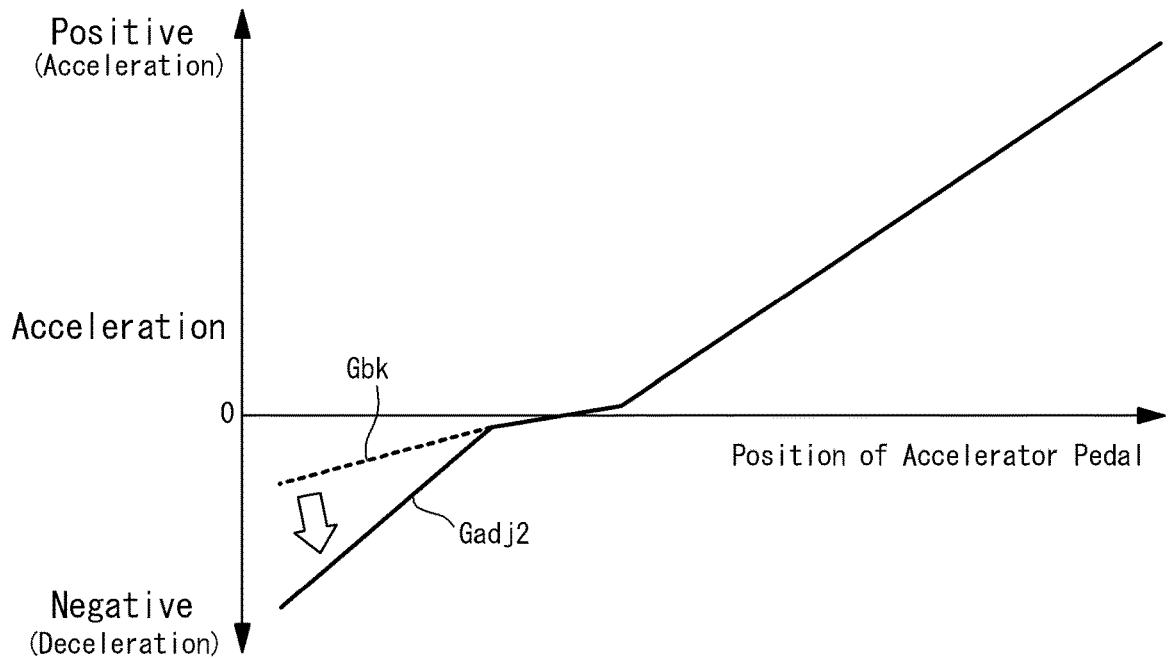
FIG. 17 is a map for correcting the target acceleration only within the decelerating range during execution of the routine shown in FIG. 13.
Figure 18:
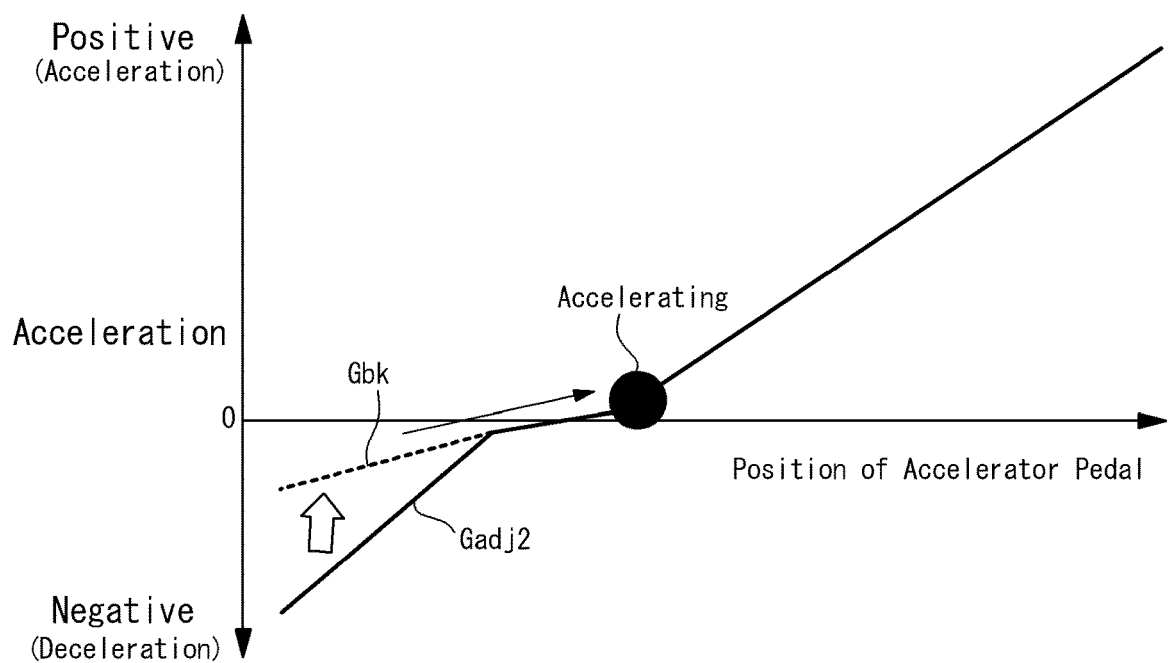
FIG. 18 is a map for controlling the acceleration based on the normal target acceleration after executing the routine shown in FIG. 13.

As indicated in the map determining the acceleration characteristic shown in FIG. 17, the target acceleration is corrected based on the correction amount Gd2 only within the decelerating range. That is, only the deceleration characteristic is corrected. After correcting the target acceleration within the decelerating range, as shown in FIG. 18, the normal target acceleration Gbk set in accordance with an operating amount of the brake pedal 5 is employed to control the acceleration of the vehicle Ve instead of the corrected target acceleration Gadj2 during accelerating the vehicle Ve. In other words, when the actual acceleration of the vehicle Ve being increased exceeds zero, the acceleration of the vehicle Ve is controlled based on the normal target acceleration Gbk instead of the corrected target acceleration Gadj2. As described, the acceleration of the vehicle Ve is controlled based on the normal target acceleration Gbk instead of the corrected target acceleration Gadj2 by resetting the correction amount Gd2 to zero. Therefore, the acceleration of the vehicle Ve can be controlled based on the normal target acceleration Gbk again after changing only the decelerating characteristic based on the correction amount Gd2 during accelerating the vehicle Ve. For this reason, the correction of the target acceleration based on the correction amount Gd2 can be terminated without providing uncomfortable feeling with the driver, and without generating a shock.

Figure 19:
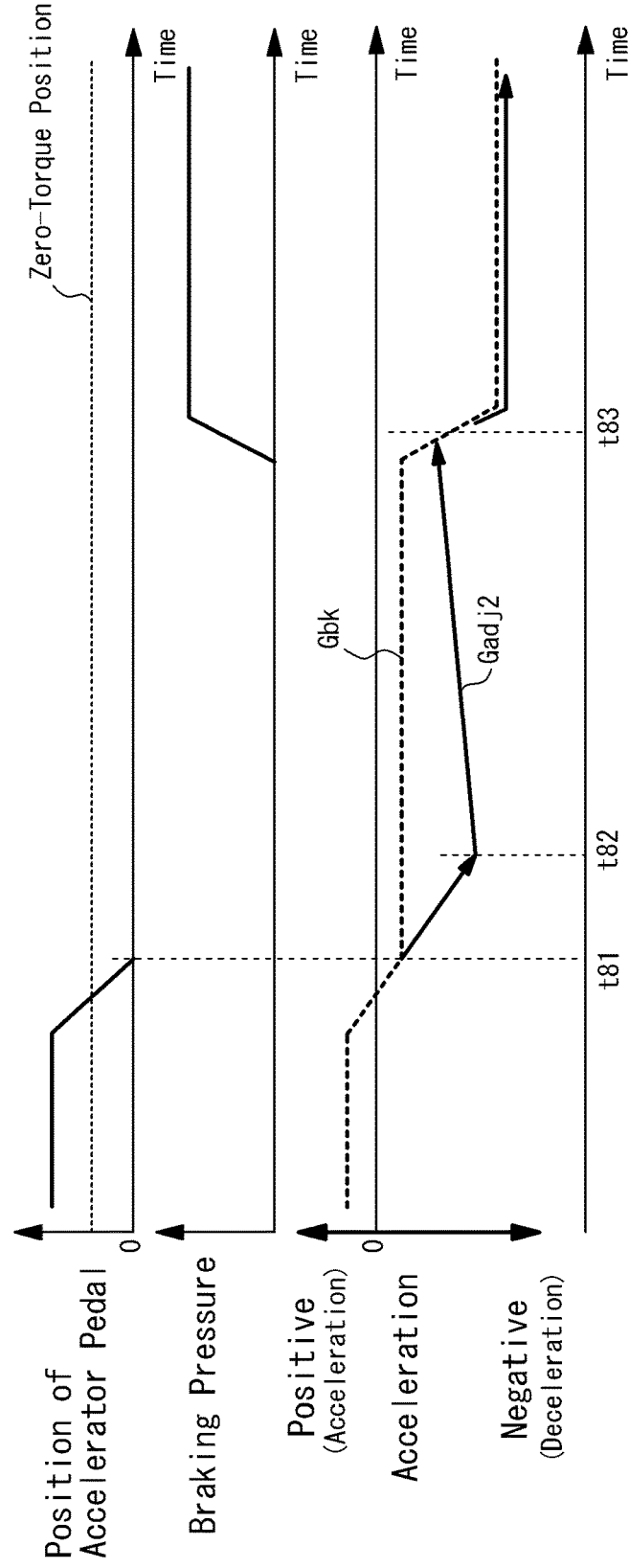
FIG. 19 is a time chart showing a temporal change in the correction amount of the target acceleration being reduced gradually during execution of the routine shown in FIG. 13.

After correcting the target acceleration based on the correction amount Gd2 in the situation where the accelerator pedal 4 being depressed is released and thereafter the brake pedal 5 is depressed, none of the pedals is operated in a predetermined period until the brake pedal 5 is depressed. As shown in FIG. 19, if such period in which none of the pedals is operated is long, the controller 8 estimates that an intention of the driver to decelerate the vehicle Ve after depressing the brake pedal 5 is weak. In this case, after correcting the target acceleration based on the correction amount Gd2 during a period from a point t81 at which the accelerator pedal 4 is returned to the initial position to a point t82, the correction amount Gd2 may be reduced gradually toward zero during a period from the point t82 to the point t83 at which the brake pedal 5 is depressed. By thus changing the corrected target acceleration Gadj2 corrected based on the correction amount Gd2 gradually to the normal target acceleration Gbk, the deceleration may be controlled properly in line with the driver's intension to decelerate the vehicle Ve mildly.

For this purpose, a reference period or a threshold period to determine a fact that the intention of the driver to decelerate the vehicle Ve is weak may be set in advance. In this case, the correction amount Gd2 may be reduced gradually after the elapse of e.g., the reference period from the point at which the accelerator pedal 4 is returned to the initial position.

Thus, when one of the accelerator pedal 4 and the brake pedal 5 is depressed after releasing the other one of the pedals, the controller 8 according to the embodiments of the present disclosure corrects the target acceleration based on an operating speed of the released pedal. As described, the controller 8 estimates that an intention of the driver to accelerate or decelerate the vehicle Ve after depressing the accelerator pedal 4 or the brake pedal 5 is strong if the operating speed of the released pedal is fast. Specifically, if the speed to return the brake pedal 5 before depressing the accelerator pedal 4 is fast, the controller 8 estimates that the driver has a desire to accelerate the vehicle Ve strongly by depressing the accelerator pedal 4. By contrast, if the speed to return the accelerator pedal 4 before depressing the brake pedal 5 is fast, the controller 8 estimates that the driver has a desire to decelerate the vehicle Ve strongly by depressing the brake pedal 5. In those cases, the controller 8 increases the correction amount of the acceleration or deceleration with an increase in the operating speed of the released pedal thereby enhancing the acceleration or deceleration after depressing the other one of the pedals. Therefore, acceleration and deceleration of the vehicle Ve can be controlled properly in line with the driver's intention without providing uncomfortable feeling with the driver and without generating a shock, in the case of depressing one of the accelerator pedal 4 and the brake pedal 5 after releasing the other one of the accelerator pedal 4 and the brake pedal 5 during propulsion in the one-pedal mode.

Although the above exemplary embodiments of the present disclosure have been described, it will be understood by those skilled in the art that the present disclosure should not be limited to the described exemplary embodiments, and various changes and modifications can be made within the scope of the present disclosure. For example, the target acceleration may also be corrected taking account of road information obtained by a navigation system (not shown) such as a road configuration and a road curvature, and visual information obtained by an on-board camera (not shown) such as existence of pedestrians and obstacles.

Specifically, in a case that the accelerator pedal 4 is depressed after releasing the brake pedal 5 when travelling on a curve and then entering into a straight road, the target acceleration is corrected in such a manner as to reduce the deceleration of the vehicle Ve. By contrast, in a case that the vehicle Ve travelling on a straight road enters into a curve, or that the vehicle Ve travels continuously on a curve, the target acceleration is reduced not to weaken the deceleration significantly. Further, in a case that an obstacle is detected and the controller 8 determines that the vehicle may collide against the obstacle, the target acceleration is corrected in such a manner as to enhance the deceleration.

By thus correcting the target acceleration taking account of the information collected by the navigation system and the on-board camera, the acceleration and deceleration may be controlled further properly and safely in line with the driver's intention.

What is claimed is:

1. A vehicle control system, that is applied to a vehicle that can be propelled in one-pedal mode in which a braking force is applied to the vehicle by manipulating a brake pedal, and a driving force and the braking force are controlled by manipulating an accelerator pedal to accelerate and decelerate the vehicle, comprising:
    a detector that collects data relating to operating states of the accelerator pedal and the brake pedal; and
    a controller that is configured to
    set a target acceleration to control the driving force and the braking force based on the data collected by the detector,
    obtain an operating speed of one of the accelerator pedal and the brake pedal returned to an initial position in a case of depressing the other one of the accelerator pedal and the brake pedal after releasing said one of the accelerator pedal and the brake pedal,
    set the target acceleration based on an operating amount of the pedal depressed after releasing said one of the accelerator pedal and the brake pedal, and
    increase a correction amount to correct the target acceleration if the operating speed of the pedal returned to an initial position is fast.

2. The vehicle control system as claimed in claim 1, wherein the controller is further configured to
    obtain an operating speed of the brake pedal returned to the initial position in a case of depressing the accelerator pedal after releasing the brake pedal,
    set the target acceleration based on an operating amount of the accelerator pedal depressed after releasing the brake pedal, and
    correct the target acceleration to reduce deceleration of the vehicle if the operating speed of the brake pedal is fast.

3. The vehicle control system as claimed in claim 1, wherein the controller is further configured to
    obtain an operating speed of the accelerator pedal returned to the initial position in a case of depressing the brake pedal after releasing the accelerator pedal,
    set the target acceleration based on an operating amount of the brake pedal depressed after releasing the accelerator pedal, and
    correct the target acceleration to increase deceleration of the vehicle if the operating speed of the accelerator pedal is fast.

4. The vehicle control system as claimed in claim 1, wherein the controller is further configured to
    correct the target acceleration only within a decelerating range where the target acceleration is a negative value, and
    control acceleration of the vehicle based on a normal target acceleration set in accordance with an operating amount of the accelerator pedal or the brake pedal instead of the corrected target acceleration during accelerating the vehicle, after correcting the target acceleration within the decelerating range.

5. The vehicle control system as claimed in claim 2, wherein the controller is further configured to
    correct the target acceleration only within a decelerating range where the target acceleration is a negative value, and
    control acceleration of the vehicle based on a normal target acceleration set in accordance with an operating amount of the accelerator pedal or the brake pedal instead of the corrected target acceleration during accelerating the vehicle, after correcting the target acceleration within the decelerating range.

6. The vehicle control system as claimed in claim 3, wherein the controller is further configured to
    correct the target acceleration only within a decelerating range where the target acceleration is a negative value, and
    control acceleration of the vehicle based on a normal target acceleration set in accordance with an operating amount of the accelerator pedal or the brake pedal instead of the corrected target acceleration during accelerating the vehicle, after correcting the target acceleration within the decelerating range.

7. The vehicle control system as claimed in claim 1, wherein the controller is further configured to reduce the correction amount of the target acceleration gradually toward zero during a period from a point at which a correction of the target acceleration is completed after releasing the one of the accelerator pedal and the brake pedal to a point at which the other one of the accelerator pedal and the brake pedal is depressed.

8. The vehicle control system as claimed in claim 2, wherein the controller is further configured to reduce the correction amount of the target acceleration gradually toward zero during a period from a point at which a correction of the target acceleration is completed after releasing the one of the accelerator pedal and the brake pedal to a point at which the other one of the accelerator pedal and the brake pedal is depressed.

9. The vehicle control system as claimed in claim 3, wherein the controller is further configured to reduce the correction amount of the target acceleration gradually toward zero during a period from a point at which a correction of the target acceleration is completed after releasing the one of the accelerator pedal and the brake pedal to a point at which the other one of the accelerator pedal and the brake pedal is depressed.

10. The vehicle control system as claimed in claim 4, wherein the controller is further configured to reduce the correction amount of the target acceleration gradually toward zero during a period from a point at which a correction of the target acceleration is completed after releasing the one of the accelerator pedal and the brake pedal to a point at which the other one of the accelerator pedal and the brake pedal is depressed.

11. The vehicle control system as claimed in claim 5, wherein the controller is further configured to reduce the correction amount of the target acceleration gradually toward zero during a period from a point at which a correction of the target acceleration is completed after releasing the one of the accelerator pedal and the brake pedal to a point at which the other one of the accelerator pedal and the brake pedal is depressed.

12. The vehicle control system as claimed in claim 6, wherein the controller is further configured to reduce the correction amount of the target acceleration gradually toward zero during a period from a point at which a correction of the target acceleration is completed after releasing the one of the accelerator pedal and the brake pedal to a point at which the other one of the accelerator pedal and the brake pedal is depressed.

* * * * *